United States Patent
Kan et al.

(10) Patent No.: US 11,934,045 B2
(45) Date of Patent: Mar. 19, 2024

(54) EYEWEAR, AND NON-TRANSITORY COMPUTER-READABLE RECORDING MEDIUM

(71) Applicant: Mitsui Chemicals, Inc., Tokyo (JP)

(72) Inventors: Ryuki Kan, Nagoya (JP); Takafumi Ohto, Nagoya (JP); Akihiro Muramatsu, Marugame (JP); Eiichiro Hikosaka, Nagoya (JP); Akifumi Aono, Nagoya (JP)

(73) Assignee: Mitsui Chemicals, Inc., Tokyo (JP)

( * ) Notice: Subject to any disclaimer, the term of this patent is extended or adjusted under 35 U.S.C. 154(b) by 272 days.

(21) Appl. No.: 17/280,203

(22) PCT Filed: Sep. 26, 2019

(86) PCT No.: PCT/JP2019/037811
§ 371 (c)(1),
(2) Date: Mar. 26, 2021

(87) PCT Pub. No.: WO2020/067265
PCT Pub. Date: Apr. 2, 2020

(65) Prior Publication Data
US 2022/0035180 A1    Feb. 3, 2022

(30) Foreign Application Priority Data

Sep. 27, 2018   (JP) .................................. 2018-182616
Sep. 27, 2018   (JP) .................................. 2018-182617

(51) Int. Cl.
G02B 27/00    (2006.01)
G02C 7/08    (2006.01)
(Continued)

(52) U.S. Cl.
CPC .............. *G02C 7/083* (2013.01); *G06F 3/011* (2013.01); *G06F 3/14* (2013.01); *G06F 3/03547* (2013.01)

(58) Field of Classification Search
None
See application file for complete search history.

(56) References Cited

U.S. PATENT DOCUMENTS

2009/0046349 A1    2/2009   Haddock
2012/0250152 A1*   10/2012  Larson .................... G02B 30/25
                                                         359/464

(Continued)

FOREIGN PATENT DOCUMENTS

CN    105607252 A    5/2016
EP    3115831 A1    1/2017
(Continued)

OTHER PUBLICATIONS

International Search Report from International Application No. PCT/JP2019/037811 dated Dec. 24, 2019.

*Primary Examiner* — Carl Adams
(74) *Attorney, Agent, or Firm* — Shih IP Law Group, PLLC

(57) ABSTRACT

This eyewear is provided with: a frame; a lens which is supported by the frame, and which includes an optical characteristic varying portion having an optical characteristic which is varied by means of electric control; a communication portion for receiving information from an external terminal; and a control portion for controlling the optical characteristic varying portion on the basis of the information received from the external terminal.

10 Claims, 21 Drawing Sheets

(51) Int. Cl.
    *G06F 3/01*     (2006.01)
    *G06F 3/14*     (2006.01)
    *G06F 3/0354*     (2013.01)

(56) References Cited

U.S. PATENT DOCUMENTS

| | | | |
|---|---|---|---|
| 2016/0171771 A1* | 6/2016 | Pedrotti | G06F 3/002 345/633 |
| 2018/0165942 A1* | 6/2018 | Hoshino | G06F 3/04815 |
| 2018/0356652 A1* | 12/2018 | Shibuya | G02B 27/0093 |
| 2019/0079316 A1 | 3/2019 | Ballet et al. | |

FOREIGN PATENT DOCUMENTS

| | | | |
|---|---|---|---|
| JP | 2008257671 A | 10/2008 |
| JP | 2010532496 A | 10/2010 |
| JP | 2016212150 A | 12/2016 |
| WO | 2018168570 A1 | 9/2018 |
| WO | 2018168644 A1 | 9/2018 |

* cited by examiner

| USER ID | MEDIUM INFORMATION | FIRST ANGLE INFORMATION | SECOND ANGLE INFORMATION |
|---|---|---|---|
| USER ID. 1 | INFORMATION MEDIUM ID. 1 (SMARTPHONE 1) | 15° | 3° |
| USER ID. 1 | INFORMATION MEDIUM ID. 2 (SMARTPHONE 2) | 17° | 4° |
| USER ID. 1 | INFORMATION MEDIUM ID. 3 (TABLET) | 18° | 5° |
| USER ID. 1 | INFORMATION MEDIUM ID. 4 (LAPTOP PC) | 20° | 7° |
| USER ID. 1 | INFORMATION MEDIUM ID. 5 (DESKTOP PC) | 20° | 5° |
| USER ID. 1 | INFORMATION MEDIUM ID. 6 (BOOK) | 14° | 0° |
| USER ID. 1 | INFORMATION MEDIUM ID. 7 (NEWSPAPER) | 16° | 0° |

EYEWEAR, AND NON-TRANSITORY COMPUTER-READABLE RECORDING MEDIUM

TECHNICAL FIELD

The present invention relates to an eyewear and a program.

BACKGROUND ART

In recent years, development of electronic devices that can be worn by users has been proceeding. Examples of the electronic devices include an eyewear (for example, electronic glasses) having regions of which the optical power can be changed by voltage (see PTL 1).

Each lens of the above-described eyewear includes a transparent first substrate in which a transparent first electrode is disposed on one surface, a transparent second substrate in which a transparent second electrode is disposed on one surface, and a liquid crystal layer disposed between the first electrode and the second electrode. Specifically, a diffraction region having a plurality of concentric ridges is provided in at least part of the first substrate. The liquid crystal layer is disposed so as to face the diffraction region in a thickness direction of the first substrate.

The liquid crystal layer is configured to change its refractive index in accordance with whether a voltage is applied. As the refractive index of the liquid crystal layer changes according to whether a voltage is applied to the liquid crystal layer, the optical power of a portion (hereinafter, referred to as "optical property changeable portion") corresponding to the liquid crystal layer in the lens changes.

CITATION LIST

Patent Literature

PTL 1
Japanese Unexamined Patent Application Publication (Translation of PCT Application) No. 2010-532496

SUMMARY OF INVENTION

Technical Problem

In the case of an eyewear having the above-described optical property changeable portion, the eyewear is not intended to control the optical property changeable portion in cooperation with an external terminal, such as a smartphone and a personal computer.

The present invention is contemplated in view of the above-described situation, and it is a task to provide a technology for enabling an eyewear to control an optical property changeable portion in cooperation with an external terminal, such as a smartphone and a personal computer.

Solution to Problem

An eyewear according to an aspect of the present invention includes a frame, a lens that is supported by the frame and that has an optical property changeable portion of which an optical property is changed by electrical control, a communication section that receives first information from an external terminal, and a control section that controls the optical property changeable portion based on the first information.

A program according to an aspect of the present invention causes a computer to execute processing, the computer being mounted on an external terminal wirelessly connected to an eyewear, the program causing the computer to execute: a process of detecting first information that is at least one of information on the external terminal, information on the eyewear, and information on a user of the eyewear; and a process of transmitting the first information to the eyewear.

Advantageous Effects of Invention

According to the present invention, an eyewear is capable of controlling its optical property changeable portion in cooperation with an external terminal.

BRIEF DESCRIPTION OF DRAWINGS

FIG. 15 is a view for illustrating the data structure of data to be stored in storage sections of the electronic glasses, the external terminal, and the server.

DESCRIPTION OF EMBODIMENTS

Some embodiments of the present invention will be described in detail with reference to the drawings. Like reference signs are assigned to the same elements throughout the specification unless otherwise noted. The content described below together with the attached drawings is intended to illustrate example embodiments and is not intended to describe a sole embodiment. When, for example, the order of operations is described in an embodiment, the order of operations may be modified as needed without a contradiction to the overall operations. Hereinafter, for the sake of convenience of description, description will be made separately for Embodiment 1 and Embodiment 2; however, Embodiment 1 and Embodiment 2 may be applied in combination as needed. In Embodiment 1 and Embodiment 2, elements assigned with different reference signs may be implemented by the same hardware without a technical contradiction.

Embodiment 1

Hereinafter, the configuration of an eyewear according to Embodiment 1 of the present invention will be described. The eyewear may be, for example, electronic glasses G shown in FIG. 1.

Figure 1:
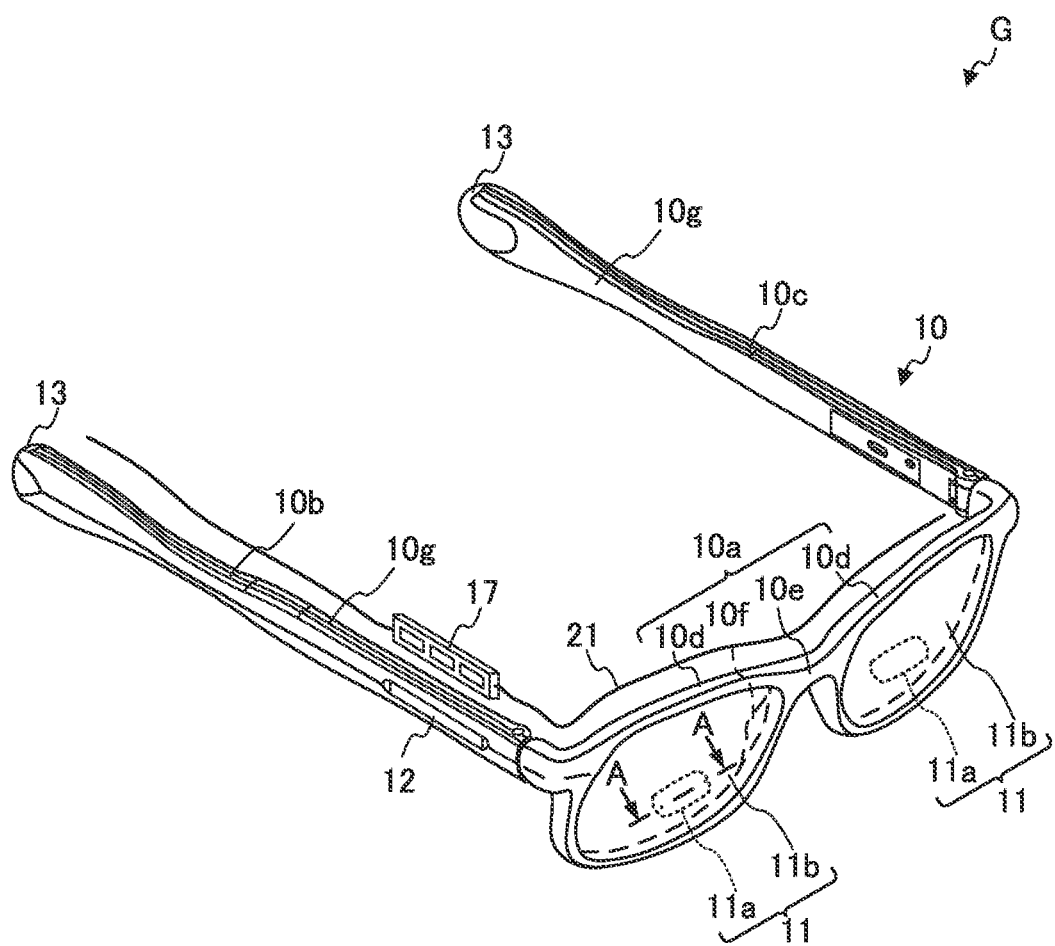
FIG. 1 is a perspective view of electronic glasses.
Figure 2:
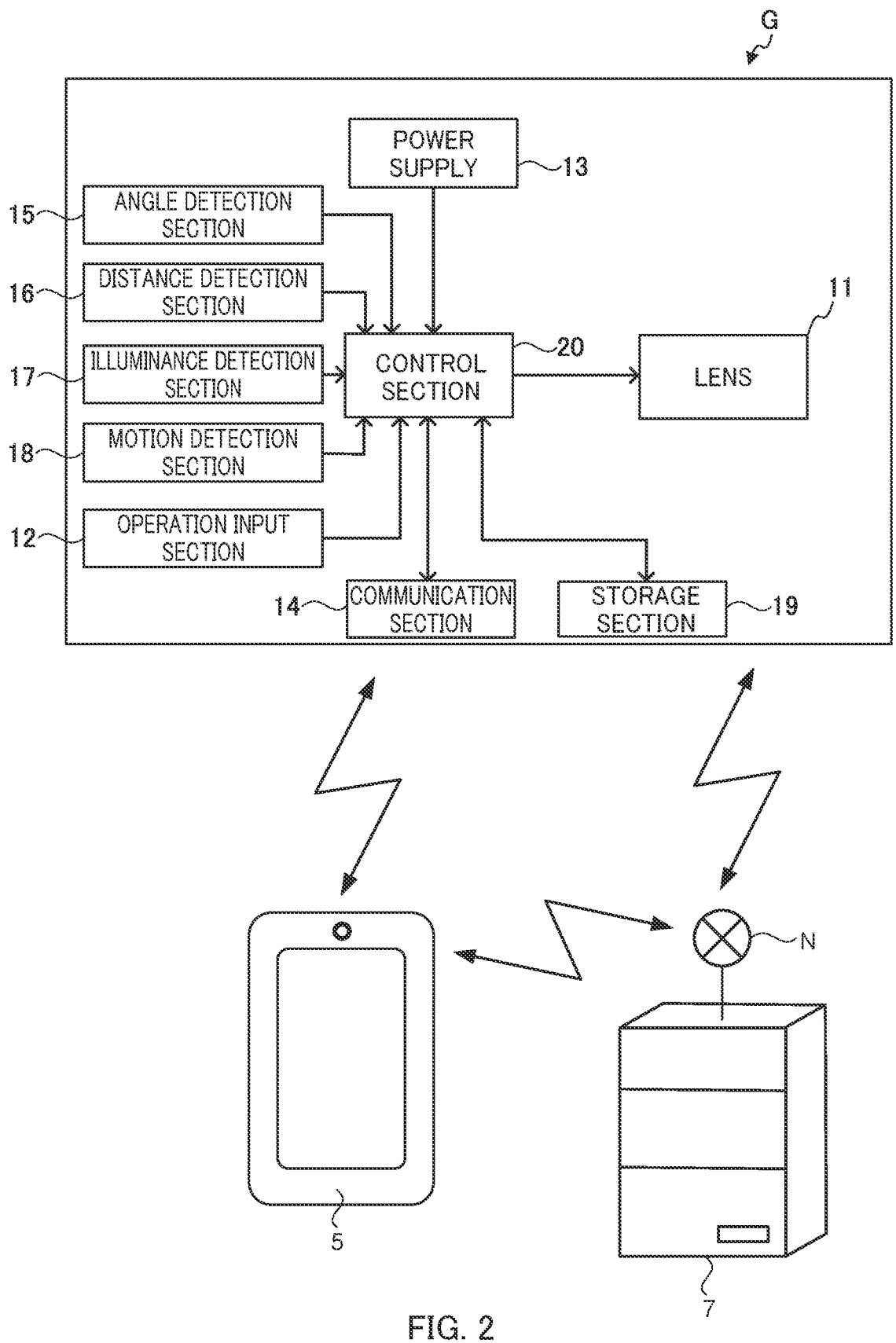
FIG. 2 is a block diagram showing an example of the internal circuit and system configuration of the electronic glasses according to Embodiment 1.

FIG. 1 is a perspective view of electronic glasses G. FIG. 2 is a block diagram showing an example of the internal circuit and system configuration of electronic glasses G.

<Electronic Glasses>

Electronic glasses G include frame 10, a pair of lenses 11, operation input section 12, power supplies 13, communication section 14, angle detection section 15, distance detection section 16, illuminance detection section 17, motion detection section 18, storage section 19, control section 20, and the like. In the following description, a portion where front 10a is disposed will be described as the front (front side) of electronic glasses G.

A user (wearer) of electronic glasses G changes the optical property (optical power, light transmittance, or the like) of property changeable portion 111 (see FIG. 3) in first region 11a of each lens 11 by operating (for example, touch operation) operation input section 12 provided on frame 10. Property changeable portion 111 corresponds to an example of an optical property changeable portion.

When operation input section 12 is operated by a user, control section 20 switches between a state where a voltage is applied to property changeable portion 111 (hereinafter, referred to as "on state") and a state where no voltage is applied (hereinafter, referred to as "off state") based on the operation. The on state of property changeable portion 111 is also the on state of electronic glasses G. The off state of property changeable portion 111 is also the off state of electronic glasses G.

<Lens>

Figure 3:
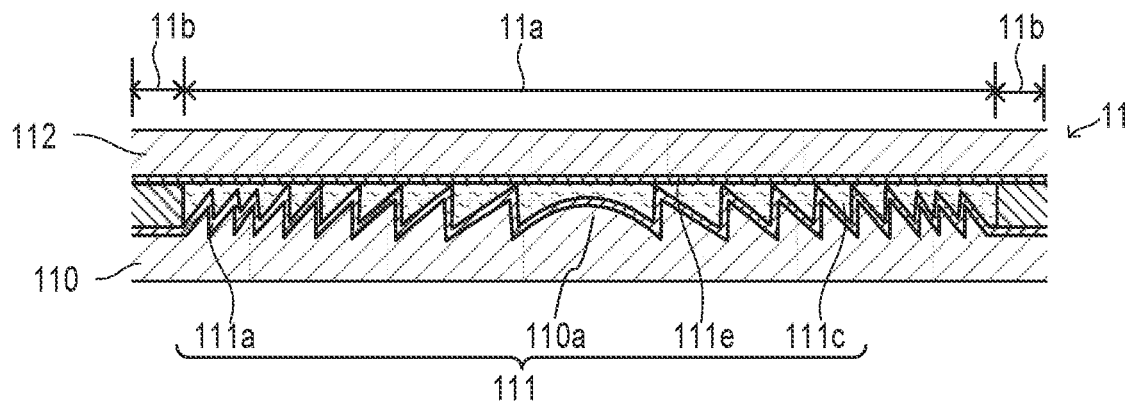
FIG. 3 is a cross-sectional view of a lens.

FIG. 3 is a schematic cross-sectional view showing an example of the configuration of each of the pair of lenses 11. FIG. 3 is a cross-sectional view taken along the line A-A in FIG. 1. In the following description, lens 11 of electronic glasses G for the right eye will be described.

Lens 11 has first region (electrically activated region) 11a capable of changing its optical power by voltage and second region 11b provided in a region other than first region 11a.

<First Region>

As shown in FIG. 3, first region 11a includes first substrate 110, property changeable portion 111, second substrate 112, and the like, in order from the rear side (lower side in FIG. 3).

First region 11a has substantially the same optical power as the optical power of second region 11b in the off state of property changeable portion 111. On the other hand, first region 11a has an optical power different from the optical power of second region 11b in the on state of property changeable portion 111.

<Property Changeable Portion>

Property changeable portion 111 includes diffraction structure 110a, first electrode 111a, liquid crystal module 111c, second electrode 111e, and the like, in order from the rear side.

Property changeable portion 111 has a predetermined refractive index in the on state where a voltage is applied to liquid crystal module 111c. The optical property of property changeable portion 111, which changes as a result of application of a voltage, is not limited to refractive index. As an example, when a lens is an electronic lens, the optical property of property changeable portion 111, which changes as a result of application of a voltage, may be a light transmittance.

<Front>

As shown in FIG. 1, front 10a has a pair of rims 10d that support the pair of lenses 11, and bridge 10e that connects the pair of rims 10d in the width direction. The shape of each rim 10d is a shape corresponding to the shape of an associated one of lenses 11. Bridge 10e has a pair of nose pads 10f that can contact with the nose of a user.

As shown in FIG. 1, wires 21 for electrically connecting first electrode 111a and second electrode 111e of each lens 11 to control section 20 (described later) are provided inside front 10a (for example, a recessed groove formed on the inner peripheral surface).

First electrode 111a and second electrode 111e may be connected to conductive portions (not shown) of wires 21 by conductive members (not shown), such as conductive rubber.

<Temple>

The pair of temples 10b, 10c is formed substantially bilaterally symmetric in electronic glasses G, and temples 10b, 10c have substantially the same component elements. Accordingly, in the following description, right-side (one side in the width direction) temple 10b will be described.

Temple 10b is connected to front 10a at its front end. For example, temple 10b may be pivotably engaged with rim 10d of front 10a. As shown in FIG. 1, temple 10b includes casing 10g.

<Operation Input Section>

Operation input section 12 is held by casing 10g. Operation input section 12 includes, for example, a capacitance-type detection pad. The detection pad may be a known detection pad that can be used as a touch sensor. Operation input section 12 may detect a change in capacitance, which is caused by the contact of the finger of a user when the finger contacts with operation input section 12.

<Example of Input Operation>

Operation input section 12 receives, for example, an input operation (touch operation) of a user to operation input section 12. Operation input section 12 receives multiple different input operations. Above-described control section 20 performs control corresponding to an input operation received by operation input section 12. Hereinafter, an example of the input operation will be described.

A first input operation is an input operation for switching property changeable portion 111 from the off state to the on state. Operation input section 12 may receive the first input operation in the off state of property changeable portion 111.

A second input operation is an input operation for switching property changeable portion 111 from the on state to the off state. Operation input section 12 may receive the second input operation in the on state of property changeable portion 111.

<Power Supply>

Power supplies 13 supply electric power to operation input section 12, communication section 14, angle detection section 15, distance detection section 16, illuminance detection section 17, motion detection section 18, storage section 19, control section 20, and the like. In the present embodiment, power supplies 13 are rechargeable battery packs detachably held at the other ends (rear ends) of temples 10b, 10c.

<Communication Section>

Communication section 14 communicates with external terminal 5 (described later) through wireless communication. Therefore, communication section 14 may include, for example, a transmitting section and a receiving section (not shown) for information. Communication of communication section 14 with external terminal 5 may be controlled by, for example, control section 20.

Wireless communication may be Wi-Fi (registered trademark), Bluetooth (registered trademark), wireless LAN, near field communication (NFC), or the like.

Communication section 14 may have a function to communicate with server 7 (described later) via network N. Communication of communication section 14 with server 7 may be controlled by, for example, control section 20.

Communication section 14 receives information from external terminal 5. Information received by communication section 14 from external terminal 5 may include, for example, at least one of information on the state of external terminal 5 (hereinafter, referred to as "terminal state information"), information on the state of electronic glasses G (hereinafter, referred to as "glasses state information"), and information on the state of a user of electronic glasses G (hereinafter, referred to as "user state information"). Communication section 14 transmits received information to control section 20. Such information may be used for control over property changeable portion 111, which is executed by control section 20. The terminal state information, the glasses state information, and the user state information each correspond to an example of first information.

The terminal state information may include, for example, information indicating the start of use of external terminal 5. The information indicating the start of use may be, for example, information indicating that the power of external terminal 5 switches from an off state to an on state. The information indicating the start of use may be information indicating that a sleep mode of external terminal 5 is released. The information indicating the start of use may be information indicating that a specific application is launched on external terminal 5. A plurality of the specific applications may be set. The specific application may be an application registered in advance in external terminal 5. The information indicating the start of use may be information indicating that an input operation of a user is performed on external terminal 5.

The terminal state information may include information on the font size of text to be displayed on the screen of external terminal 5 by an application a user has started using (also referred to as text size information), information indicating the brightness (luminance) of the screen of external terminal 5, or the like.

The information indicating the start of use may be information indicating that a camera or sensor of external terminal 5 recognizes that electronic glasses G enter within a predetermined distance (position).

The terminal state information may include, for example, information indicating the end of use of external terminal 5. The information indicating the end of use may be, for example, information indicating that the power of external terminal 5 switches from the on state to the off state. The information indicating the end of use may be information indicating that external terminal 5 switches to the sleep mode.

The information indicating the end of use may be information indicating that the specific application is exited on external terminal 5. The information indicating the end of use may be information indicating that an input operation of a user has not been performed for a predetermined time on external terminal 5.

The information indicating the end of use may be information indicating that a camera or sensor of external terminal 5 recognizes that electronic glasses G exit outside the predetermined distance (position). The information indicating the end of use may be information indicating that an acceleration sensor or an angular velocity sensor of external terminal 5 recognizes that external terminal 5 has moved at a predetermined acceleration or angular velocity.

The terminal state information may include, for example, information on a difference between the brightness (luminance) of the screen of external terminal 5 and ambient light around external terminal 5. The terminal state information may be information on a distance from the eyes of a user (which may be electronic glasses G) to external terminal 5.

The glasses state information may include at least one of information on the angle (posture) of electronic glasses G and information on the movement (motion) of electronic glasses G.

The user state information may include information on the posture of a user, information on a distance between a user or electronic glasses G and external terminal 5, and information on the duration of use of external terminal 5. The user state information may also include user image information picked up by image pickup section 54 of external terminal 5.

<Angle Detection Section>

Angle detection section 15 corresponds to an example of a first angle detection section and is, for example, an angle sensor provided in temple 10b of electronic glasses G. Angle detection section 15 may be provided in temple 10c. Angle detection section 15 may be provided in front 10a.

Figure 4A:
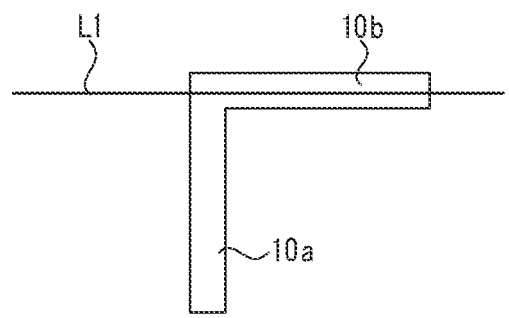
FIG. 4A is a schematic diagram for illustrating a forward tilting angle of the electronic glasses.
Figure 4B:
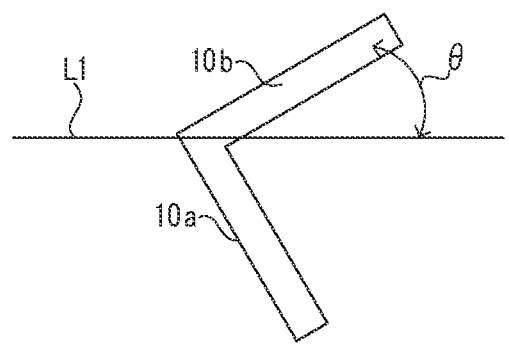
FIG. 4B is a schematic diagram for illustrating a forward tilting angle of the electronic glasses.

Angle detection section 15 detects information on the angle of electronic glasses G. Angle detection section 15 may detect the angle of electronic glasses G at predetermined time intervals. Angle detection section 15 may detect, for example, forward tilting angle θ of electronic glasses G with respect to a horizontal direction (see straight line L1 in FIGS. 4A and 4B). For example, as shown in FIG. 4A, forward tilting angle θ in a state where temple 10b of electronic glasses G is parallel to the horizontal direction may be set as a forward tilting angle in a reference state. As shown in FIG. 4B, forward tilting angle θ increases as electronic glasses G tilt forward from the reference state.

In a state where forward tilting angle θ is 0°, it is determined that a user is facing forward. As forward tilting angle θ increases, it is determined that the face of the user is facing downward. Angle detection section 15 may transmit a detected value (angle information) to control section 20. Angle detection section 15 may transmit a detected value (angle information) to storage section 19.

<Distance Detection Section>

Figure 4C:
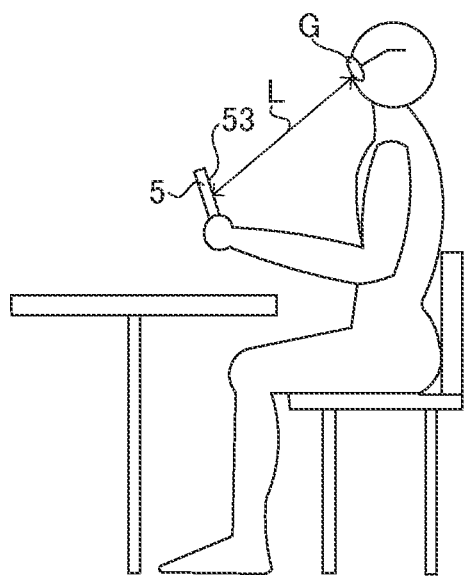
FIG. 4C is a schematic diagram for illustrating a distance between the electronic glasses and an external terminal.
Figure 4D:
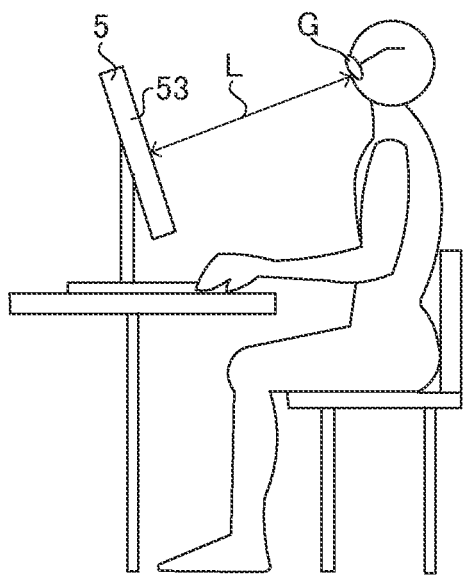
FIG. 4D is a schematic diagram for illustrating a distance between the electronic glasses and the external terminal.

Distance detection section 16 is, for example, a range sensor, such as an infrared range sensor, an ultrasonic range sensor, and a laser range sensor, provided at front 10a of electronic glasses G. Distance detection section 16 detects distance L (see FIGS. 4C and 4D) between electronic glasses G and an object facing electronic glasses G in an optical axis direction of lens 11 (hereinafter, simply referred to as "optical axis direction"). In FIG. 4C, external terminal 5 is a smartphone or a tablet terminal. In FIG. 4D, external terminal 5 is a desktop personal computer.

For example, distance detection section 16 detects distance L between electronic glasses G and external terminal 5 (specifically, display section 53 of external terminal 5) facing electronic glasses G in the optical axis direction. Distance detection section 16 may transmit a detected value (distance information) to control section 20. Distance detection section 16 may transmit a detected value (distance information) to storage section 19.

Distance detection section 16 may acquire above-described distance L from external terminal 5. External terminal 5 may calculate above-described distance L based on an image picked up by the image pickup apparatus, such as a camera. As an example, at the time of picking up an image, external terminal 5 may calculate above-described distance L based on information on a distance at which focus is achieved with an autofocus function. Distance information calculated by external terminal 5 corresponds to an example of user state information.

<Illuminance Detection Section>

Illuminance detection section 17 is, for example, an illuminance sensor provided at front 10a of electronic glasses G. Illuminance detection section 17 detects an ambient illuminance Illuminance detection section 17 may transmit a detected value (illuminance information) to control section 20. Illuminance detection section 17 may transmit a detected value (illuminance information) to storage section 19. Illuminance detection section 17 may be, for example, an ultraviolet illuminance sensor.

Illuminance detection section 17 may acquire illuminance information from external terminal 5. External terminal 5 may acquire illuminance information around electronic glasses G based on image information picked up by the image pickup apparatus, such as a camera, or a detected value of an illuminance sensor. Illuminance information corresponds to an example of glasses state information.

<Motion Detection Section>

Motion detection section 18 detects that electronic glasses G are moving (that is, a user is moving). Motion detection section 18 may detect at least one of the walking motion, stand-up motion, and sit-down motion of the user of electronic glasses G. Motion detection section 18 is, for example, an angular velocity sensor or acceleration sensor provided in frame 10 (front 10a, temple 10b, or temple 10c). Motion detection section 18 may transmit a detected value (motion information) to control section 20. Motion detection section 18 may transmit a detected value (motion information) to storage section 19.

The above-described motion information may be transmitted by control section 20 to a terminal (hereinafter, referred to as "monitoring terminal") of a person (for example, a family member or the like) who is watching the user of electronic glasses G from a remote location. The watching person is able to know that the user of electronic glasses G is doing an activity based on the motion information displayed on a display section of the monitoring terminal.

<Storage Section>

Storage section 19 stores information acquired from external terminal 5 by communication section 14. Specifically, storage section 19 may store at least one of terminal state information, glasses state information, and user state information acquired from external terminal 5 by communication section 14.

Storage section 19 may store at least one of angle information, distance information, illuminance information, and motion information detected by the detection sections of electronic glasses G (hereinafter, referred to as "information on usage status").

Storage section 19 may store information on usage status in association with information on a user (for example, user ID). Storage section 19 may store information on usage status in association with information on electronic glasses G (for example, glass ID). A glass ID is information for identifying electronic glasses G.

Storage section 19 may store at least one of the use start time of external terminal 5, the use end time of external terminal 5, and the duration of use of external terminal 5.

Storage section 19 may store the duration of the on state of property changeable portion 111.

<Control Section>

Control section 20 is electrically connected to the detection pad of operation input section 12, first electrode 111a, and second electrode 111e via wires 21. Such control section 20 controls the functions of above-described communication section 14, angle detection section 15, distance detection section 16, illuminance detection section 17, motion detection section 18, and storage section 19.

When operation input section 12 detects the contact of an object, control section 20 changes the optical power or light transmittance of first region 11a by applying a voltage to the pair of lenses 11 or stopping application of a voltage to the pair of lenses 11 (see FIG. 2).

Specifically, when operation input section 12 receives information indicating to stop application of a voltage to property changeable portion 111, control section 20 stops application of a voltage to property changeable portion 111.

When operation input section 12 receives information indicating to apply a voltage to property changeable portion 111, control section 20 applies a voltage to property changeable portion 111.

Control section 20 controls property changeable portion 111 based on information received from external terminal 5 by communication section 14. Specifically, control section 20 may control property changeable portion 111 based on at least one of terminal state information, glasses state information, and user state information received from external terminal 5 by communication section 14. The above-described one information corresponds to an example of first information.

More specifically, when control section 20 has acquired information indicating the start of use of external terminal 5 from communication section 14, control section 20 may set electronic glasses G to the on state by applying a voltage to the pair of lenses 11.

When control section 20 has acquired information indicating the start of use of external terminal 5 from communication section 14, control section 20 may determine whether to set electronic glasses G to the on state based on this information and angle information acquired from angle detection section 15. Specifically, when control section 20 has acquired information indicating the start of use of external terminal 5 from communication section 14, control section 20 detects the posture of a user based on angle information acquired from angle detection section 15. When the posture of the user is a posture suitable for the use of external terminal 5, control section 20 may set electronic glasses G to the on state.

When control section 20 has acquired information indicating the end of use of external terminal 5 from communication section 14, control section 20 may set electronic glasses G to the off state by stopping application of a voltage to the pair of lenses 11.

When electronic glasses G is set to the on state through automatic start-up control for electronic glasses (described later), control section 20 acquires the duration of the on state of electronic glasses G (hereinafter, simply referred to as "duration of the on state"). Control section 20 determines whether the duration of the on state is longer than or equal to a predetermined time. When the duration of the on state is longer than or equal to the predetermined time, control section 20 controls communication section 14 such that communication section 14 transmits information indicating that the duration of the on state exceeds the predetermined time (hereinafter, "time excess information") to external terminal 5.

Control section 20 may calculate a difference between the brightness (illuminance) of ambient light around external terminal 5 and the brightness (luminance) of display section 53 of external terminal 5 (hereinafter, referred to as "difference in brightness") based on illuminance information acquired from illuminance detection section 17. Control section 20 may acquire, from external terminal 5, information on the brightness of display section 53 of external terminal 5.

Control section 20 may determine whether the difference in brightness is greater than or equal to a predetermined value. When the difference in brightness is greater than or equal to the predetermined value, control section 20 may control communication section 14 such that communication section 14 transmits usage improving information to external terminal 5. Usage improving information is information for causing external terminal 5 to execute a usage improving process. The usage improving process to be executed in external terminal 5 in this case may be, for example, a process of displaying, on display section 53, information indicating that the difference in brightness is greater than or equal to the predetermined value. The usage improving process may be a process of displaying, on display section 53, information prompting to reduce the difference in brightness. The usage improving process may be a process of adjusting the brightness (luminance) of display section 53 of external terminal 5 such that the difference in brightness reduces.

Control section 20 may control communication section 14 such that communication section 14 transmits at least one of acquired angle information, distance information, illuminance information, and motion information (information on usage status) to server 7 connected to electronic glasses G. Control section 20 may incorporate information on a user of electronic glasses G (for example, user ID) into information on usage status.

Control section 20 may incorporate information on electronic glasses G (for example, glass ID) into information on usage status. Information on usage status may be information acquired from angle detection section 15, distance detection section 16, illuminance detection section 17, and motion detection section 18. Information on usage status may be information stored in storage section 19.

In the on state and/or off state of property changeable portion 111, control section 20 may detect information about the fact that a user is moving, a motion time of the user, and/or the like (hereinafter, referred to as "user motion information") based on motion information acquired from motion detection section 18. Control section 20 may control communication section 14 such that communication section 14 transmits user motion information to the above-described monitoring terminal.

Control section 20 may determine the posture of a user based on acquired angle information. When, for example, forward tilting angle θ (see FIG. 4B) of electronic glasses G is greater than or equal to a predetermined angle, control section 20 may determine that the posture of the user is bad. When forward tilting angle θ of electronic glasses G is less than the predetermined angle, control section 20 may determine that the posture of the user is good. When the posture of the user is bad (not appropriate), control section 20 may control communication section 14 such that communication section 14 transmits usage improving information to external terminal 5. Usage improving information corresponds to an example of information on a determined result of a control section.

Control section 20 may determine the posture of a user based on acquired distance information. When, for example, distance L (see FIG. 4C) between electronic glasses G and external terminal 5 is shorter than or equal to a predetermined value, control section 20 may determine that the posture of the user is bad. When distance L between electronic glasses G and external terminal 5 is longer than the predetermined value, control section 20 may determine that the posture of the user is good. When the posture of the user is bad (not appropriate), control section 20 may control communication section 14 such that communication section 14 transmits usage improving information to external terminal 5. Usage improving information corresponds to an example of information on a determined result of a control section.

Control section 20 may cause storage section 19 to sequentially store acquired angle information and/or acquired distance information. Control section 20 may calculate the duration of the posture of the user based on current angle information and/or current distance information and past angle information and/or distance information stored in storage section 19.

Control section 20 may determine whether the state where the posture of a user is bad has continued for a predetermined time or longer. When the state where the posture of the user is bad has continued for the predetermined time or longer, control section 20 may control communication section 14 such that communication section 14 transmits usage improving information to external terminal 5. Usage improving information is information for causing external terminal 5 to execute a usage improving process. Usage improving information corresponds to an example of information on a determined result.

When the state where the posture of the user is bad has continued for the predetermined time or longer, control section 20 may control communication section 14 such that communication section 14 transmits fatigue notification information to external terminal 5. Fatigue notification information is information for causing external terminal 5 to execute a fatigue improving process.

The above-described functions implemented by control section 20 may be realized by an integrated circuit or realized by control section 20 reading and executing a program stored in storage section 19.

For example, a CPU that functions as control section 20 may control operations of the above-described functional sections by reading a program for executing the above-described functions from a ROM that functions as storage section 19, expanding the program onto a RAM, and executing the expanded program. The hardware configuration of electronic glasses G may be substantially the same as the hardware configuration of external terminal 5 (described later). Therefore, the description of the hardware configuration of external terminal 5 (described later) may be used as needed for the description of the hardware configuration of electronic glasses G.

Electronic glasses G may include a detection section that acquires body information, such as the heart rate and blood flow of a user, at the nose pads, temples, or bows where electronic glasses G contact with part of the body of the user, which is not shown in the drawing.

<Timing of Data Transmission to Server>

Hereinafter, a transmission method in which electronic glasses G transmit information on usage status of electronic glasses G to server 7 will be described.

A first transmission method is a method in which, each time information on usage status (angle information, distance information, illuminance information, motion information, and the like) is detected in electronic glasses G, electronic glasses G transmit the detected information on usage status to server 7.

A second transmission method is a method in which electronic glasses G transmit information on usage status, stored in storage section 19, to server 7 at predetermined timing. The predetermined timing may be, for example, timing at which electronic glasses G switch from the on state to the off state, timing at which electronic glasses G switch from the off state to the on state, or timing at which a state where electronic glasses G are not used (for example, a state where angle information, illuminance information, motion information, and the like, that are information on usage status of electronic glasses G have not changed for a certain time) has continued for a certain time.

A third transmission method is a method of transmitting information on usage status to server 7 via external terminal 5. Electronic glasses G may transmit information on usage status to external terminal 5 at predetermined timing. External terminal 5 may transmit received information on usage status to server 7 at predetermined timing.

External terminal 5 may transmit information on usage status to server 7 each time external terminal 5 receives information on usage status from electronic glasses G. Alternatively, external terminal 5 may store received information on usage status in storage section 58 and transmit the information on usage status, stored in storage section 58, to server 7 at predetermined timing.

A fourth transmission method is a method of transmitting information on usage status to server 7 via a charger (not shown) that has a function to communicate with server 7 and a function to supply power to electronic glasses G. In the case of the fourth transmission method, information on usage status of electronic glasses G may be transmitted to server 7 via a communication section of the charger at the time when electronic glasses G are charged by the charger. In this case, information on usage status may be accumulated in a storage section included in a unit (not shown) including a rechargeable battery.

<External Terminal>

Figure 5:
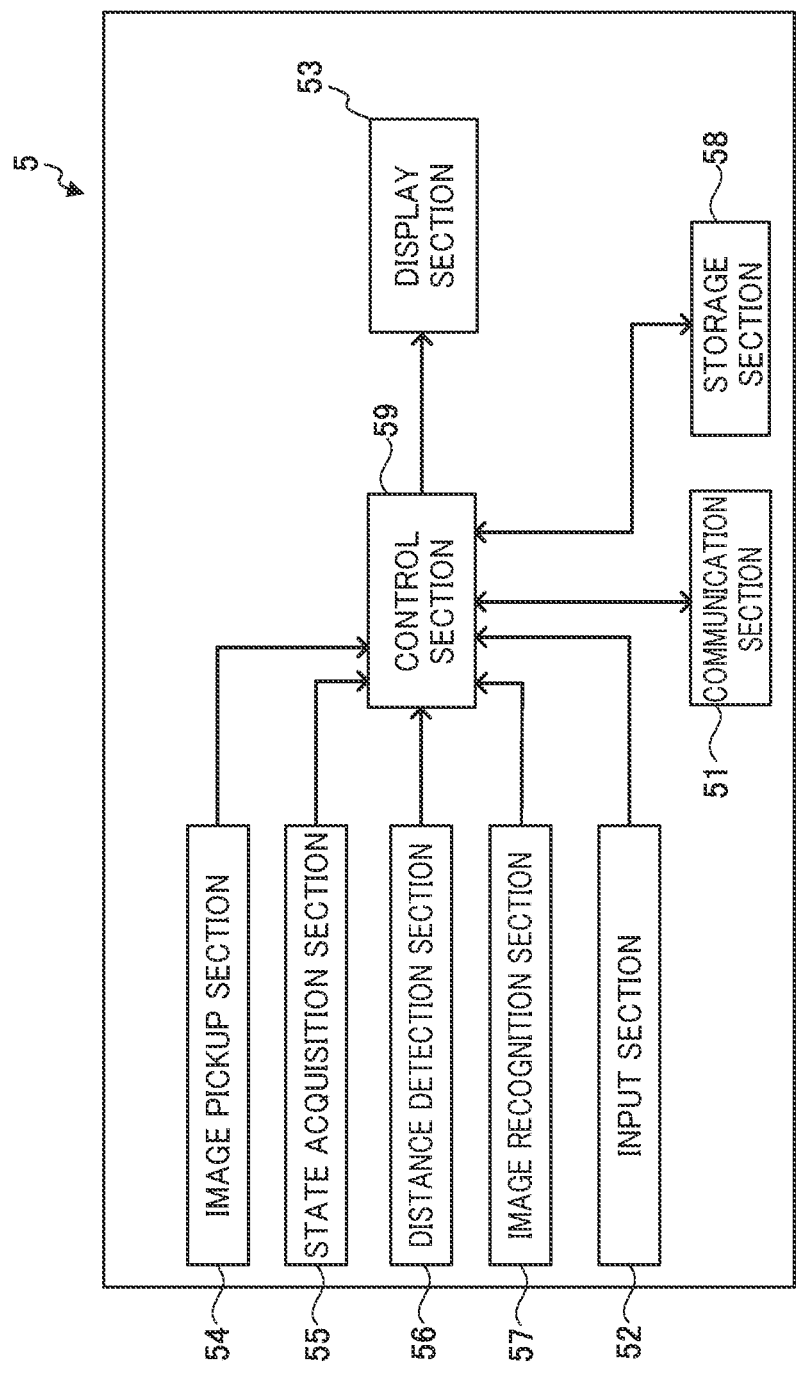
FIG. 5 is a block diagram showing an example of the configuration of the external terminal.

As shown in FIG. 5, external terminal 5 includes communication section 51, input section 52, display section 53, image pickup section 54, state acquisition section 55, distance detection section 56, image recognition section 57, storage section 58, control section 59, and the like.

External terminal 5 is a smartphone, a tablet terminal, a desktop computer, a laptop computer, or the like.

<Communication Section>

Communication section 51 communicates with electronic glasses G through wireless communication. Communication section 51 may communicate with server 7 via network N. Therefore, communication section 51 may include, for example, a transmitting section and a receiving section (not shown) for information. Communication of communication section 51 with electronic glasses G may be controlled by, for example, control section 59.

<Information to Be Transmitted by Communication Section>

Communication section 51 transmits information to electronic glasses G. Specifically, communication section 51 may transmit at least one of terminal state information, glasses state information, and user state information to electronic glasses G. The terminal state information, the glasses state information, and the user state information each correspond to an example of first information.

The user state information may include, for example, image information picked up by image pickup section 54. The user state information may include a detected value (distance information) of distance detection section 56.

Communication section 51 may transmit information to server 7. Specifically, communication section 51 may transmit at least one of terminal state information, glasses state information, and user state information to server 7.

<Information to Be Received by Communication Section>

Communication section 51 may receive the above-described time excess information from electronic glasses G. Communication section 51 may transmit the received time excess information to control section 59.

Communication section 51 may receive the above-described usage improving information from electronic glasses G. Communication section 51 may transmit the received usage improving information to control section 59.

Communication section 51 may receive the above-described fatigue notification information from electronic glasses G. Communication section 51 may transmit the received fatigue notification information to control section 59.

<Input Section>

Input section 52 receives input of information. For example, input information from a user is received by input section 52 and is input to control section 59.

<Display Section>

Display section 53 displays information. Information to be displayed on display section 53 may be, for example, information stored in storage section 58 or may be information generated by control section 59.

Input section 52 and display section 53 may be made up of individual devices or may be made up of an integrated device capable of inputting and outputting (displaying) information in parallel like, for example, a touch panel display.

<Image Pickup Section>

Image pickup section 54 is, for example, a camera module mounted on external terminal 5. Image pickup section 54 transmits image information to control section 59. For example, image pickup section 54 picks up the image of the face of a user of external terminal 5 under control of control section 59.

Image pickup section 54 transmits image information to control section 59. Image information may include information on the face image of a user (hereinafter, referred to as "face image information"), and/or information on the image of electronic glasses G worn by the user (hereinafter, referred to as "glasses image information"). The glasses image information may be used as glass ID. The face image information corresponds to an example of user state information. The glasses image information corresponds to an example of glasses state information.

<State Acquisition Section>

State acquisition section 55 acquires information indicating the state of external terminal 5 (terminal state information) under control of control section 59. The terminal state information is as described above. State acquisition section 55 transmits the acquired terminal state information to control section 59.

<Distance Detection Section>

Distance detection section 56 detects a distance between external terminal 5 and an object (the face of a user, electronic glasses G, or the like) facing external terminal 5 based on acquired image information. Distance detection section 56 may transmit a detected value (distance information) to control section 59. A method of detecting a distance, which is performed by distance detection section 56, may be a known method. Distance information to be detected by distance detection section 56 corresponds to an example of user information.

<Image Recognition Section>

Image recognition section 57 authenticates a user who uses external terminal 5 based on acquired image information. Image recognition section 57 may authenticate a user based on user face image information included in acquired image information. Image recognition section 57 may authenticate a user based on glasses image information included in acquired image information.

Authentication of a user may be performed by, for example, comparing face image information registered in storage section 58 (hereinafter, referred to as "registered face image information") with face image information included in acquired image information. Authentication of a user may be performed by comparing glasses image information registered in storage section 58 (hereinafter, referred to as "registered glasses image information") with glasses image information included in acquired image information. The image of electronic glasses G may be used as glass ID.

When the user and/or electronic glasses are authenticated, image recognition section 57 transmits information indicating the authenticated result (hereinafter, referred to as "authentication information") to control section 59.

<Storage Section>

Storage section 58 stores registered face image information, registered glasses image information, and/or the like. Storage section 58 may store registered face image information and registered glasses image information in association with user information (user ID, or the like).

<Control Section>

Control section 59 controls, for example, the operations of elements 51 to 58 of above-described external terminal 5.

Control section 59 controls communication section 51 such that communication section 51 transmits information to electronic glasses G. For example, when control section 59 has acquired authentication information from image recognition section 57, control section 59 may control communication section 51 such that communication section 51 transmits the information to electronic glasses G. Information to be transmitted to electronic glasses G by communication section 51 may include at least one of terminal state information, user state information, and glasses state information.

Control section 59 controls the display status of display section 53 by giving display section 53 a display control signal according to information to be displayed on display section 53. Control section 59 corresponds to an example of a display control section.

Specifically, when control section 59 has acquired information indicating the start of use of external terminal 5 from state acquisition section 55, control section 59 may cause display section 53 to display an image prompting to select whether to set electronic glasses G to the on state.

A user selects whether to set electronic glasses G to the on state and inputs a selected result to input section 52. Input information from the user is received by input section 52 and is transmitted to control section 59. Hereinafter, an input operation to set electronic glasses G to the on state is referred to as on-input operation.

When control section 59 has acquired an on-input operation from input section 52, control section 59 controls communication section 51 such that communication section 51 transmits terminal state information (information indicating the start of use of external terminal 5) to electronic glasses G.

When state acquisition section 55 has acquired information indicating the end of use of external terminal 5, control section 59 may cause display section 53 to display an image prompting to select whether to set electronic glasses G to the off state.

A user selects whether to set electronic glasses G to the off state and inputs a selected result to input section 52. Input information from the user is received by input section 52 and is transmitted to control section 59. Hereinafter, an input operation to set electronic glasses G to the off state is referred to as off-input operation.

When control section 59 has acquired an off-input operation from input section 52, control section 59 controls communication section 51 such that communication section 51 transmits terminal state information (information indicating the end of use of external terminal 5) to electronic glasses G.

When control section 59 has acquired time excess information, control section 59 may execute an excess prevention process. The excess prevention process is, for example, a process of causing display section 53 to display notification information. The notification information may include information indicating that external terminal 5 has been excessively used. The notification information corresponds to an example of alert information.

The excess prevention process may include a process of switching external terminal 5 to the sleep mode. Control section 59 may switch external terminal 5 to the sleep mode after a lapse of a predetermined time from when notification information is displayed on display section 53.

Control section 59 may cause display section 53 to display an image prompting to select whether to postpone switching to the sleep mode before switching to the sleep mode. A user selects whether to make a postponement and inputs a selected result to input section 52. Input information from the user is received by input section 52 and is transmitted to control section 59. An input operation indicating to make a postponement is referred to as postponement input operation.

When control section 59 has acquired a postponement input operation from input section 52, control section 59 controls communication section 51 such that communication section 51 postpones transmission of terminal state information. A time to postpone transmission of terminal state information (hereinafter, referred to as "postponement time") may be set as needed. The postponement time may be, for example, five minutes. A postponement select image may be displayed multiple times (for example, twice) at an interval corresponding to the postponement time.

When control section 59 has acquired time excess information or fatigue notification information, control section 59 may execute the fatigue improving process. The fatigue improving process is, for example, a process of causing display section 53 to display a refresh image (for example, an image prompting a user to do exercise). The image prompting a user to do exercise may be, for example, an image in which a cursor moves to right and left. The user is able to do exercise for the eyes by following the cursor moving to the right and left with the eyes. The refresh image may contain an image causing the eyes to do exercise, an image causing the eyes to rest, or the like.

Control section 59 may cause display section 53 to display an image prompting to select whether to extend display of the refresh image before an image prompting to do exercise is displayed on display section 53. A user selects whether to make an extension of time and inputs a selected result to input section 52. Input information from the user is received by input section 52 and is transmitted to control section 59.

When control section 59 has acquired an extension input operation, control section 59 controls display section 53 such that display section 53 extends display of the refresh image.

When control section 59 has acquired usage improving information, control section 59 executes the usage improving process. The usage improving process is, for example, a process of causing display section 53 to display notification information. The notification information may include information indicating that the posture of a user is bad. The notification information may contain information on a means of improving the posture. The information on a means of improving the posture may be, for example, a message, such as "Raise your head slightly" and "Move your face away from the external terminal". The notification information corresponds to an example of alert information.

When control section 59 has acquired distance information from distance detection section 56, control section 59 may control communication section 51 such that communication section 51 transmits the acquired distance information to electronic glasses G.

Control section 59 may determine the posture of a user based on the distance information acquired from distance detection section 56. When, for example, distance L (see FIG. 4C) between electronic glasses G and external terminal 5 is shorter than or equal to a predetermined value, control section 59 may determine that the posture of the user is bad. When distance L between electronic glasses G and external terminal 5 is longer than the predetermined value, control section 59 may determine that the posture of the user is good. When the posture of the user is bad, control section 59 may execute the above-described usage improving process.

Control section 59 may determine whether the vision of a user of electronic glasses G is impaired based on long-term distance information stored in storage section 58. When, for example, the vision of the user has been gradually getting worse, distance information stored in storage section 58 may be gradually reducing. In this case, control section 59 determines that the vision of the user is impaired.

When control section 59 determines that the vision of a user has gotten worse, control section 59 may cause display section 53 to display notification information informing the user of impaired vision (hereinafter, referred to as "vision impairment notification information"). After control section 59 causes display section 53 to display vision impairment notification information, control section 59 may cause display section 53 to display a table for vision test (hereinafter, referred to as "vision test image").

When control section 59 determines that the vision of a user has gotten worse, control section 59 may cause display section 53 to display text with size according to the vision of the user.

<Hardware Configuration of External Terminal>

Figure 6:
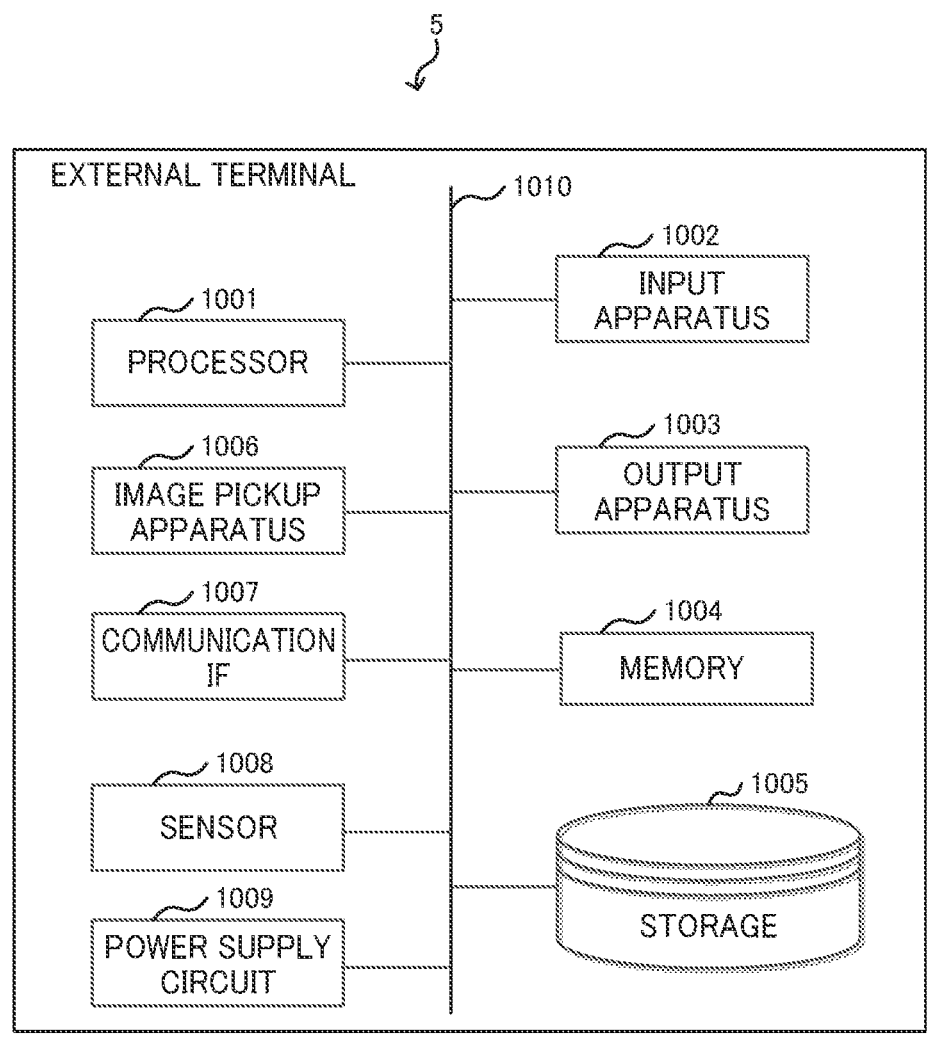
FIG. 6 is a block diagram showing the hardware configuration of the external terminal.

As shown in FIG. 6, external terminal 5, when focusing on hardware configuration, includes, for example, processor 1001, input apparatus 1002, output apparatus 1003, memory 1004, storage 1005, and image pickup apparatus 1006. External terminal 5 may include communication interface (IF) 1007, sensor 1008, and power supply circuit 1009. These elements 1001 to 1009 may be connected by, for example, bus 1010.

Processor 1001 controls the operation of external terminal 5. Processor 1001 is an example of a circuit or device having a computing power. For example, at least one of a CPU (central processing unit), a MPU (micro processing unit), and a GPU (graphics processing unit) may be used as processor 1001.

Input apparatus 1002 may include input section 52 shown in FIG. 5. Input apparatus 1002 may include a device used to input information to external terminal 5, for example, at least one of a keyboard, a touch panel, and a mouse. Information may be input to processor 1001 through input apparatus 1002.

Output apparatus 1003 may include display section 53 shown in FIG. 5. Specifically, output apparatus 1003 may include a display (or a monitor) corresponding to display section 53. The display may be a touch panel display. The touch panel display may be regarded as corresponding to both input apparatus 1002 and output apparatus 1003.

Memory 1004 stores, for example, a program to be executed by processor 1001, and data or information to be processed according to the program to be executed. Memory 1004 may include a RAM (random access memory) and a ROM (read only memory). The RAM may be used as a work memory for processor 1001. A "program" may be referred to as "software" or "application".

Storage 1005 stores, for example, a program to be executed by processor 1001, and data or information to be processed according to the program to be executed.

Storage 1005 may include a hard disk drive (HDD), or a semiconductor drive apparatus, such as a solid state drive (SSD). In addition to or instead of a semiconductor drive apparatus, a nonvolatile memory, such as a flash memory, may be included in storage 1005. Memory 1004 and storage 1005 may be regarded as corresponding to storage section 58.

A program may include a program for executing automatic start-up control for electronic glasses G (described later). All or part of program codes making up a program may be stored in memory 1004 and/or storage 1005 or may be incorporated into part of an operating system (OS).

A program and/or data may be provided as a form in which the program and/or data is recorded on a recording medium readable by processor 1001. Examples of the recording medium include a flexible disk, a CD-ROM, a CD-R, a CD-RW, an MO, a DVD, a Blu-ray Disc, and a portable hard disk. A semiconductor memory, such as a USB (universal serial bus) memory, is also an example of the recording medium.

A program and/or information may be provided (downloaded) from an application server (not shown) to external terminal 5 via network N, or the like. A program and/or information may be provided to external terminal 5 via communication IF 1007 and stored in memory 1004 and/or storage 1005. A program and/or data may be provided to external terminal 5 through input apparatus 1002 and stored in memory 1004 and/or storage 1005.

Communication IF 1007 corresponds to communication section 51 and is an interface for communicating with electronic glasses G and server 7. Communication IF 1007 may include a wireless interface for wireless communication. Communication IF 1007 may include a wire interface for wire communication.

When processor 1001 reads and executes the program stored in storage section 58, external terminal 5 realizes functions on external terminal 5 side in automatic start-up control for electronic glasses G (described later). The functions of above-described control section 59 are implemented by processor 1001 executing the program.

Image pickup apparatus 1006 is, for example, a camera module mounted on external terminal 5. Image pickup apparatus 1006 may be regarded as corresponding to image pickup section 54.

Sensor 1008 may be regarded as corresponding to distance detection section 56.

Power supply circuit 1009 supplies each of above-described elements 1001 to 1008 with electric power for elements 1001 to 1008 to operate.

<Server>

Figure 7:
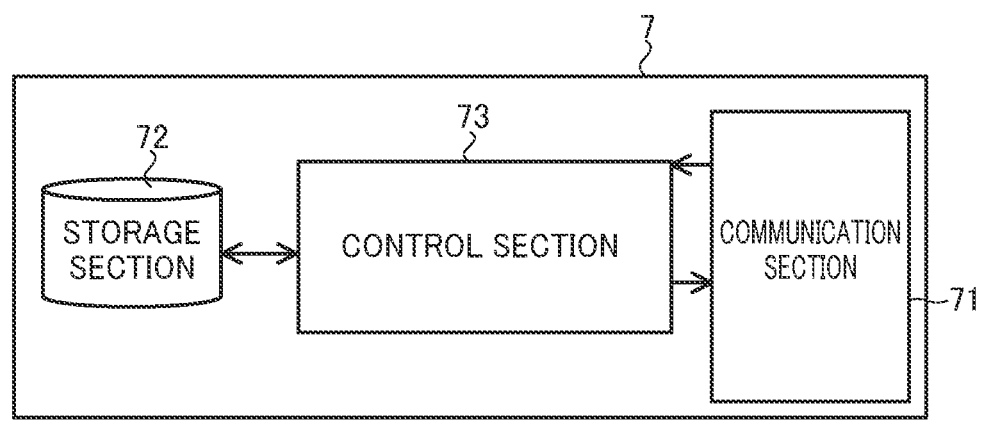
FIG. 7 is a block diagram showing an example of the configuration of a server.

As shown in FIG. 7, server 7 includes communication section 71, storage section 72, control section 73, and the like. The hardware configuration of the server 7 is substantially similar to the hardware configuration of above-described external terminal 5.

<Communication Section>

Communication section 71 communicates with electronic glasses G and/or external terminal 5 via network N (for example, the Internet). Communication of communication section 71 with electronic glasses G and/or external terminal 5 may be wire communication or may be performed partially via wireless communication. Therefore, communication section 71 may include a transmitting section, a receiving section (not shown), and the like for information. Communication with electronic glasses G and/or external terminal 5 may be controlled by control section 73.

Communication section 71 receives information on usage status from electronic glasses G. The information on usage status is as described above. Communication section 71 transmits the received information on usage status to control section 73.

<Storage Section>

Storage section 72 stores acquired information on usage status. Storage section 72 may store, for example, pieces of information included in information on usage status in association with one another.

Storage section 72 may store information on usage status for each user (for example, each user ID). Storage section 72 may store received information for each electronic glasses G (for example, each glass ID).

Storage section 72 may store at least one of terminal state information, glasses state information, and user state information acquired from external terminal 5.

<Normal Operation of Electronic Glasses>

Next, an example of the normal operation of electronic glasses G will be described. Initially, the off state of electronic glasses G will be described. In the off state of electronic glasses G, the refractive index of liquid crystal module 111c is substantially equal to the refractive indices of first substrate 110 and second substrate 112 in first region 11a of lens 11. Therefore, in property changeable portion 111, no lens effect caused by liquid crystal module 111c occurs. Therefore, in lens 11, the optical power of first region 11a is substantially equal to the optical power of second region 11b.

In the off state of electronic glasses G, when the finger of a user contacts with operation input section 12, a change in capacitance based on the contact is detected by the detection pad of operation input section 12. Detection information based on the contact is transmitted to control section 20. Control section 20 applies a voltage to property changeable portion 111 based on the acquired detection information of operation input section 12 in the off state of electronic glasses G.

Thus, alignment of the liquid crystal material in liquid crystal module 111c of property changeable portion 111 changes, and the refractive index of liquid crystal module 111c changes (set to the on state).

In the on state of electronic glasses G, the refractive index of liquid crystal module 111c is different from the refractive indices of first substrate 110 and second substrate 112. Therefore, in first region 11a, a lens effect caused by liquid crystal module 111c occurs. As a result, the optical power of first region 11a changes.

In the on state of electronic glasses G, when operation input section 12 detects the contact of the finger of a user, control section 20 stops application of a voltage to property changeable portion 111. Thus, alignment of the liquid crystal material in liquid crystal module 111c returns to the state before voltage application, and property changeable portion 111 switches from the on state to the off state.

As described above, electronic glasses G according to the present embodiment are capable of changing the optical power of first region 11a of lens 11 by detecting the contact of the finger of a user.

<Automatic Start-up Control for Electronic Glasses>

Figure 8:
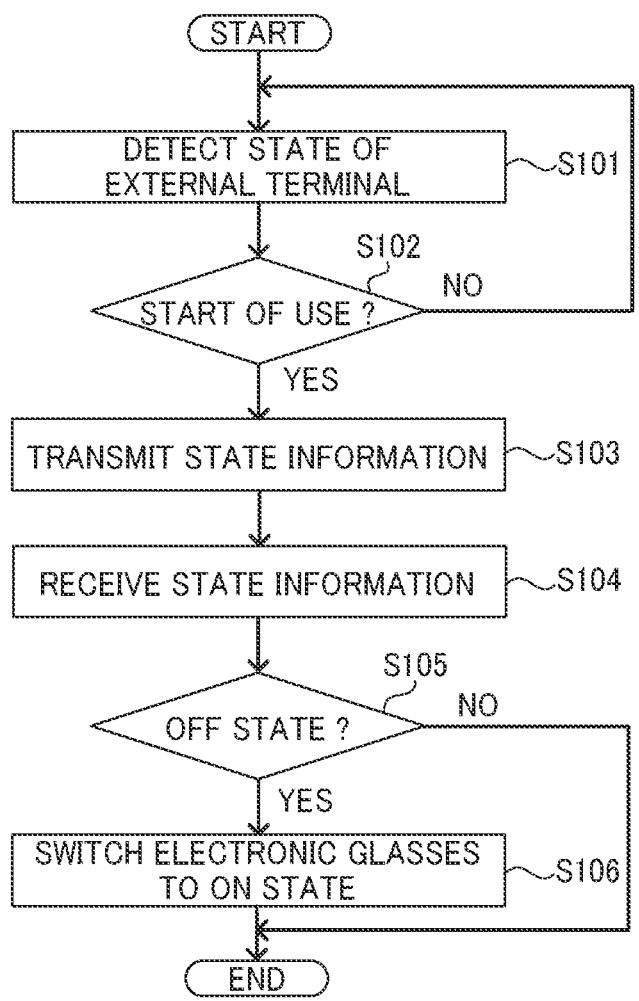
FIG. 8 is a flowchart of automatic start-up control.

Next, automatic start-up control for electronic glasses G will be described with reference to FIG. 8. FIG. 8 is a flowchart of automatic start-up control for electronic glasses G. Automatic start-up control for electronic glasses G is control for, when the use of external terminal 5 wirelessly connected to electronic glasses G is started, setting electronic glasses G to the on state in coordination with external terminal 5.

Such automatic start-up control is composed of a process to be executed in external terminal 5 and a process to be executed in electronic glasses G. Automatic start-up control may be regarded as control to be executed by a drive control system for electronic glasses, which includes electronic glasses G and external terminal 5.

Initially, in step S101 of FIG. 8, state acquisition section 55 of external terminal 5 acquires terminal state information of external terminal 5. Then, state acquisition section 55 transmits the acquired terminal state information to control section 59.

Subsequently, in step S102 of FIG. 8, control section 59 of external terminal 5 determines whether the acquired terminal state information is information indicating the start of use of external terminal 5. When the terminal state information is not information indicating the start of use of external terminal 5 in step S102 ("NO" in step S102), the control process proceeds to step S101. On the other hand, when the terminal state information is information indicating the start of use of external terminal 5 in step S102 ("YES" in step S102), the control process proceeds to step S103.

In step S103 of FIG. 8, control section 59 of external terminal 5 controls communication section 51 such that communication section 51 transmits the terminal state information (information indicating the start of use of external terminal 5) to electronic glasses G. Communication section 51 transmits the terminal state information (information indicating the start of use of external terminal 5) to electronic glasses G in step S103 of FIG. 8. The above-described control process of step S101 to step S103 is executed in external terminal 5.

Subsequently, in step S104 of FIG. 8, communication section 14 of electronic glasses G receives the terminal state information from external terminal 5. Then, communication section 14 transmits the terminal state information to control section 20.

Subsequently, in step S105 of FIG. 8, control section 20 determines whether electronic glasses G are in the off state. When electronic glasses G are not in the off state (that is, the on state) in step S105, the control process ends. On the other hand, when electronic glasses G are in the off state in step S105, the control process proceeds to step S106.

Subsequently, in step S106 of FIG. 8, control section 20 sets electronic glasses G to the on state.

<Automatic Stop Control for Electronic Glasses>

Figure 9:
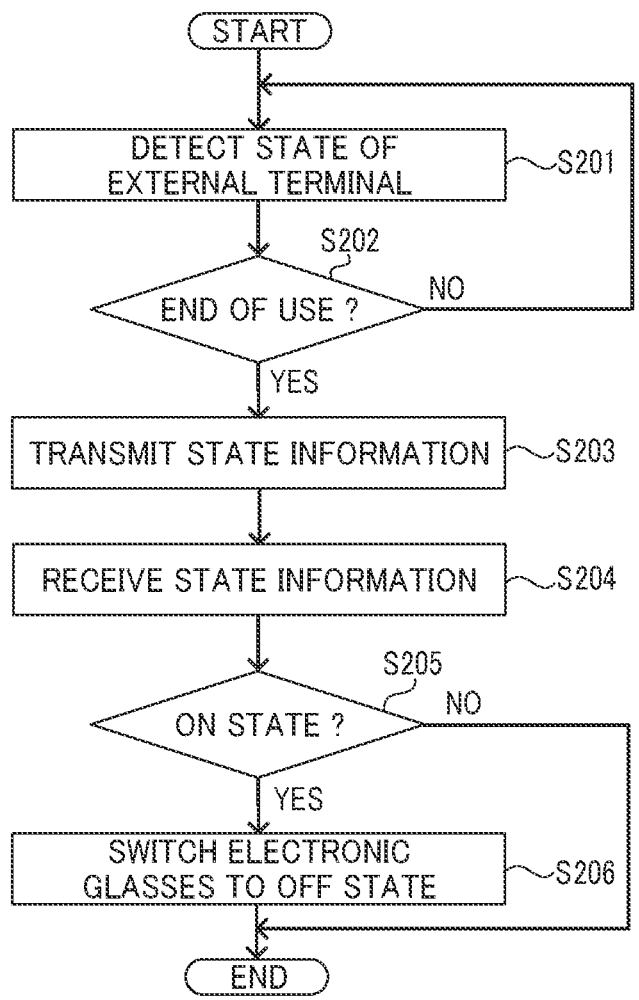
FIG. 9 is a flowchart of automatic stop control.

Next, automatic stop control for electronic glasses G will be described with reference to FIG. 9. FIG. 9 is a flowchart of automatic stop control for electronic glasses G. Automatic stop control for electronic glasses G is control for, when the use of external terminal 5 wirelessly connected to electronic glasses G is ended, setting electronic glasses G to the off state in coordination with external terminal 5.

Such automatic stop control is composed of a process to be executed in external terminal 5 and a process to be executed in electronic glasses G. Automatic stop control may be regarded as control to be executed by the drive control system for electronic glasses, which includes electronic glasses G and external terminal 5.

Initially, in step S201 of FIG. 9, state acquisition section 55 of external terminal 5 acquires terminal state information of external terminal 5. Then, state acquisition section 55 transmits the detected terminal state information to control section 59.

Subsequently, in step S202 of FIG. 9, control section 59 of external terminal 5 determines whether the acquired terminal state information is information indicating the end of use of external terminal 5. When the terminal state information is not information indicating the end of use of external terminal 5 in step S202 ("NO" in step S202), the control process proceeds to step S201. On the other hand, when the terminal state information is information indicating the end of use of external terminal 5 in step S202 ("YES" in step S202), the control process proceeds to step S203.

In step S203 of FIG. 9, control section 59 of external terminal 5 controls communication section 51 such that communication section 51 transmits the terminal state information (information indicating the end of use of external terminal 5) to electronic glasses G. Communication section 51 transmits the terminal state information (information indicating the end of use of external terminal 5) to electronic glasses G in step S203 of FIG. 9. The above-described control process of step S201 to step S203 is executed in external terminal 5.

Subsequently, in step S204 of FIG. 9, communication section 14 of electronic glasses G receives the terminal state information from external terminal 5. Then, communication section 14 transmits the terminal state information to control section 20.

Subsequently, in step S205 of FIG. 9, control section 20 determines whether electronic glasses G are in the on state. When electronic glasses G are not in the on state (that is, the off state) in step S205, the control process ends. On the other hand, when electronic glasses G are in the on state in step S205, the control process proceeds to step S206.

Subsequently, in step S206 of FIG. 9, control section 20 sets electronic glasses G to the off state. The above-described automatic start-up control and automatic stop control may be executed in parallel. Alternatively, automatic stop control may be executed when electronic glasses G are set to the on state through automatic start-up control. In this case, the process of step S205 of FIG. 9 may be omitted.

<Excess Prevention Control Over Usage Time in Electronic Glasses>

Figure 10:
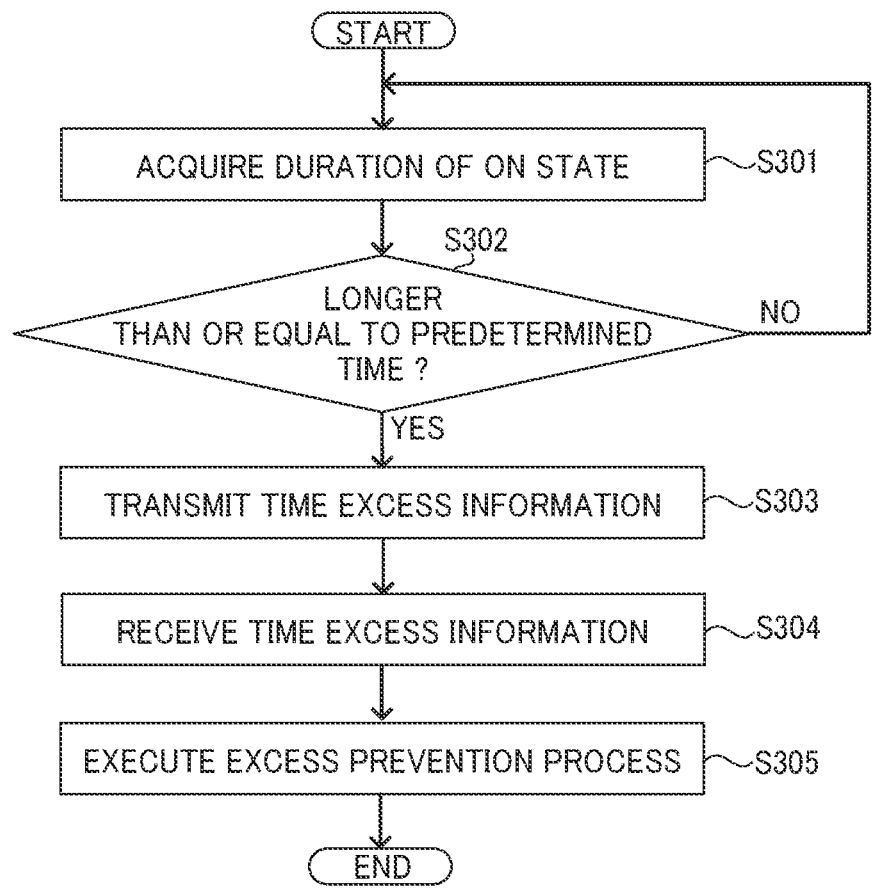
FIG. 10 is a flowchart of excess prevention control.

Next, excess prevention control over usage time in electronic glasses G will be described with reference to FIG. 10. FIG. 10 is a flowchart of excess prevention control over usage time. Excess prevention control over usage time is control for, when the duration of the on state of electronic glasses G is longer than or equal to a predetermined time on the assumption that electronic glasses G are set to the on state through the above-described automatic start-up control, causing external terminal 5 wirelessly connected to electronic glasses G to execute an excess prevention process.

Such excess prevention control is composed of a process to be executed in external terminal 5 and a process to be executed in electronic glasses G. Excess prevention control may be regarded as control to be executed by the drive control system for electronic glasses, which includes electronic glasses G and external terminal 5.

Initially, in step S301 of FIG. 10, control section 20 of electronic glasses G acquires the duration of the on state of electronic glasses G.

Subsequently, in step S302 of FIG. 10, control section 20 of electronic glasses G determines whether the duration of the on state is longer than or equal to the predetermined time. When it is determined in step S302 that the duration of the on state is shorter than the predetermined time ("NO" in step S302), the control process proceeds to step S301. On the other hand, when it is determined in step S302 that the duration of the on state is longer than or equal to the predetermined time ("YES" in step S302), the control process proceeds to step S303.

Subsequently, in step S303 of FIG. 10, control section 20 of electronic glasses G controls communication section 14 such that communication section 14 transmits time excess information to external terminal 5. In step S303, communication section 14 transmits time excess information to external terminal 5. The above-described control process of steps S301 to S303 is executed in electronic glasses G.

Subsequently, in step S304 of FIG. 10, communication section 51 of external terminal 5 receives the time excess information. Communication section 51 transmits the received time excess information to control section 59 of external terminal 5.

Subsequently, in step S305 of FIG. 10, control section 59 of external terminal 5 executes the excess prevention process. The excess prevention process is as described above. The above-described excess prevention control is preferably executed after electronic glasses G are set to the on state through automatic start-up control. Excess prevention control may be executed at predetermined time intervals.

<Usage Improving Control in Electronic Glasses>

Figure 11:
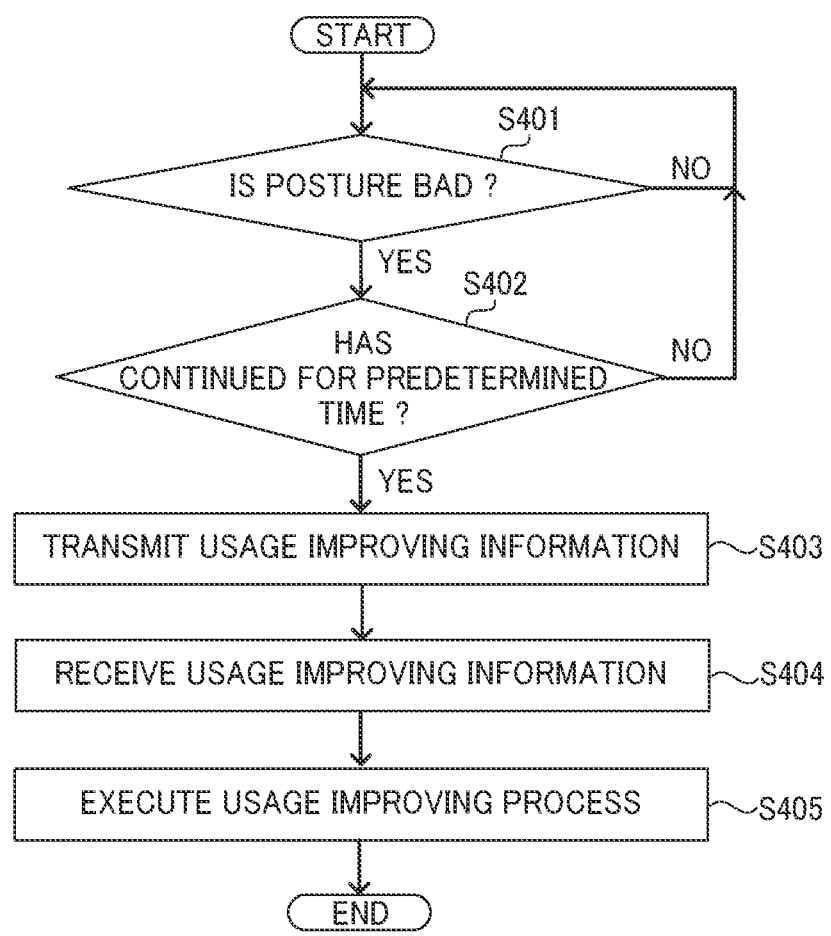
FIG. 11 is a flowchart of usage improving control.

Next, usage improving control in electronic glasses G will be described with reference to FIG. 11. FIG. 11 is a flowchart showing a process to be executed in usage improving control. Usage improving control is control for, when the posture of a user is bad in the on state of electronic glasses G, causing external terminal 5 wirelessly connected to electronic glasses G to execute a usage improving process.

Such usage improving control is composed of a process to be executed in external terminal 5 and a process to be executed in electronic glasses G. Usage improving control may be regarded as control to be executed by the drive control system for electronic glasses, which includes electronic glasses G and external terminal 5.

Initially, in step S401 of FIG. 11, control section 20 of electronic glasses G determines whether the posture of a user is bad based on acquired angle information, acquired distance information, and/or the like. A method of determining the posture of a user is as described above. When the posture of the user is not bad in step S401, the control process proceeds to step S401. When the posture of the user is bad in step S401, the control process proceeds to step S402.

Subsequently, in step S402 of FIG. 11, control section 20 of electronic glasses G determines whether the duration of the posture is longer than or equal to a predetermined time. A method of calculating the duration of a posture is as described above. When the duration of the posture is shorter than the predetermined time in step S402, the control process proceeds to step S401. On the other hand, when the duration of the posture is longer than or equal to the predetermined time in step S402, the control process proceeds to step S403.

Subsequently, in step S403 of FIG. 11, control section 20 of electronic glasses G controls communication section 14 such that communication section 14 transmits usage improving information to external terminal 5. In step S403, communication section 14 transmits usage improving information to external terminal 5. The usage improving information is as described above. The above-described control process of steps S401 to S403 is executed in electronic glasses G.

Subsequently, in step S404 of FIG. 11, communication section 51 of external terminal 5 receives the usage improving information. Communication section 51 transmits the received usage improving information to control section 59 of external terminal 5.

Subsequently, in step S405 of FIG. 11, control section 59 of external terminal 5 executes a usage improving process. The usage improving process is as described above. The above-described usage improving control is preferably executed after electronic glasses G are set to the on state through automatic start-up control. Usage improving control may be executed at predetermined time intervals.

Operation and Advantageous Effects

According to the above-described present embodiment, it is possible to switch electronic glasses G between the on state and the off state in coordination with the state of external terminal 5 wirelessly connected to electronic glasses G.

Specifically, when, for example, a user starts using an external terminal, such as a smartphone, in a state where the user is wearing electronic glasses G, electronic glasses G switch from the off state to the on state. When an image to select whether to set electronic glasses G to the on state is displayed on the display section of the external terminal when the user starts using the external terminal, it is possible not to set electronic glasses G to the on state in an unnecessary situation for the user.

In the case of the present embodiment, a user is able to know that the duration of the on state of electronic glasses G is long through display of external terminal 5, caused by the above-described excess prevention process. Such a function is effective to maintain the eye health of the user.

In the case of the present embodiment, the user is able to know that a working posture is bad through display of external terminal 5, caused by the above-described usage improving process. Such a function is effective to maintain not only the eye health of the user but also the overall body health of the user.

Embodiment 2

Hereinafter, the configuration of an eyewear according to Embodiment 2 of the present invention will be described. In the description of the present embodiment, the drawings used in the description of above-described Embodiment 1 are referenced as needed. In the specification, for the sake of convenience, Embodiment 2 will be described as an embodiment different from Embodiment 1. The eyewear and program according to the present embodiment may be implemented in combination with the eyewear and program according to Embodiment 1 as needed.

Figure 12:
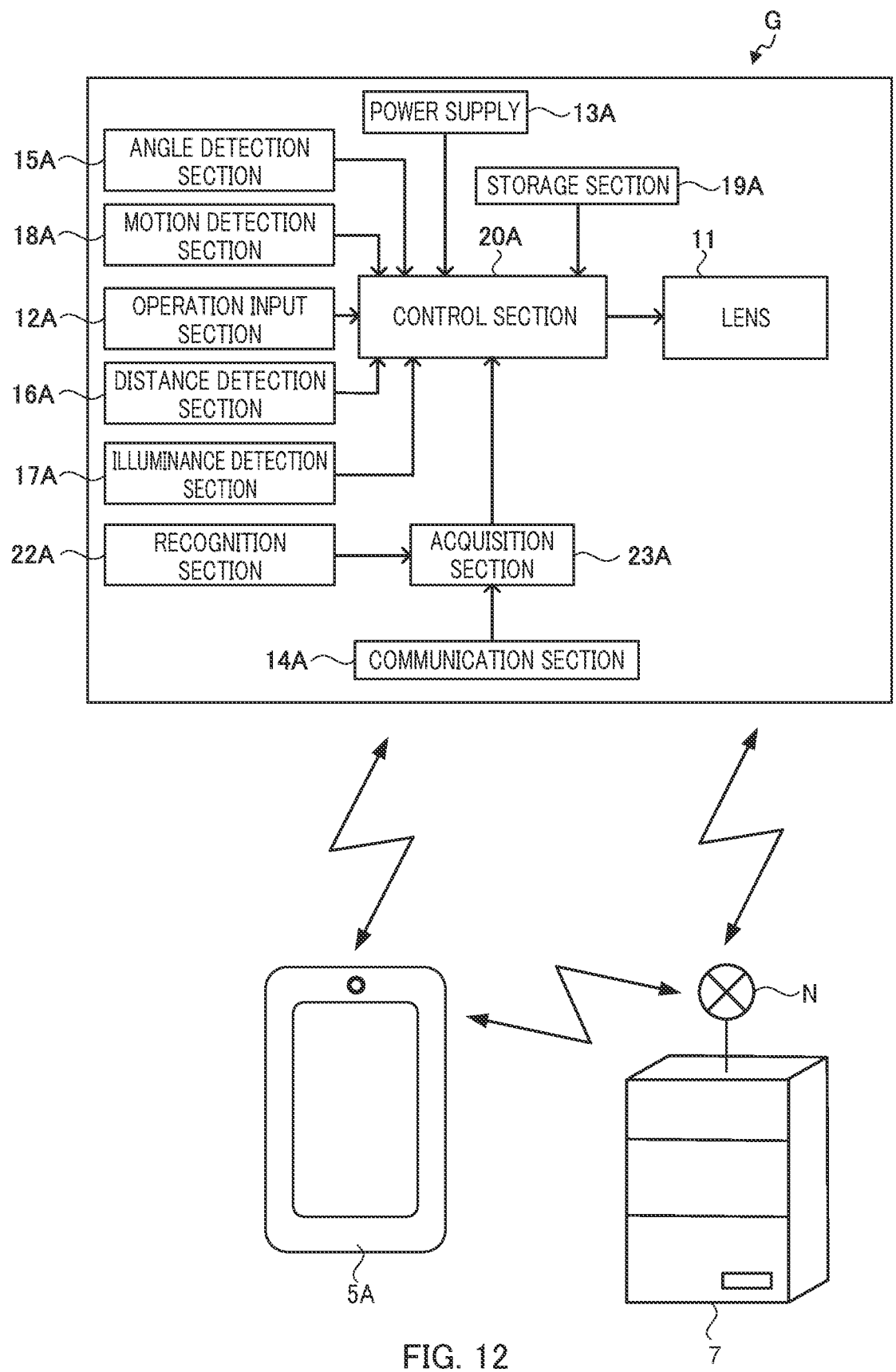
FIG. 12 is a block diagram showing an example of the internal circuit and system configuration of electronic glasses according to Embodiment 2.

The eyewear according to the present embodiment has a basic configuration similar to that of electronic glasses G shown in FIG. 1 as in the case of Embodiment 1. FIG. 12 is a block diagram showing an example of the internal circuit and system configuration of electronic glasses G. The configuration of electronic glasses G according to the present embodiment may be made up of the same hardware as the configuration of electronic glasses G according to Embodiment 1 or may be made up of different hardware.

<Electronic Glasses>

Electronic glasses G include frame 10, the pair of lenses 11, operation input section 12A, power supplies 13A, communication section 14A, angle detection section 15A, distance detection section 16A, illuminance detection section 17A, motion detection section 18A, storage section 19A, recognition section 22A, acquisition section 23A, control section 20A, and the like. In the following description, a portion where front 10a is disposed will be described as the front (front side) of electronic glasses G.

A user (wearer) of electronic glasses G changes the optical property (optical power, light transmittance, or the like) of property changeable portion 111 (see FIG. 3) in first region 11a of each lens 11 by operating (for example, touch operation) operation input section 12A provided on frame 10. Property changeable portion 111 corresponds to an example of an optical property changeable portion.

When operation input section 12A is operated by a user, control section 20A switches between a state where a voltage is applied to property changeable portion 111 (hereinafter, referred to as "on state") and a state where no voltage is applied (hereinafter, referred to as "off state") based on the operation. The on state of property changeable portion 111 is also the on state of electronic glasses G. The off state of property changeable portion 111 is also the off state of electronic glasses G.

Electronic glasses G according to the present embodiment have the configuration of the pair of lenses 11 shown in FIG. 3, as in the case of electronic glasses G according to Embodiment 1. Therefore, the description of lenses 11 is omitted. Electronic glasses G according to the present embodiment have the configuration of front 10a and the pair of temples 10b, 10c shown in FIG. 1, as in the case of electronic glasses G according to Embodiment 1. Therefore, the description of front 10a and temples 10b, 10c is omitted.

<Operation Input Section>

Operation input section 12A is held by casing 10g. Operation input section 12A includes, for example, a capacitance-type detection pad. The detection pad may be a known detection pad that can be used as a touch sensor. Operation input section 12A may detect a change in capacitance, which is caused by the contact of the finger of a user when the finger contacts with operation input section 12A. Operation input section 12A may be the same operation input section as operation input section 12 of Embodiment 1.

<Example of Input Operation>

Operation input section 12A receives, for example, an input operation (touch operation) of a user to operation input section 12A. Operation input section 12A receives multiple different input operations. Control section 20A (described later) performs control corresponding to an input operation received by operation input section 12A. Hereinafter, an example of the input operation will be described.

A first input operation is an input operation for switching property changeable portion 111 from the off state to the on state. Operation input section 12A may receive the first input operation in the off state of property changeable portion 111.

A second input operation is an input operation for switching property changeable portion 111 from the on state to the off state. Operation input section 12A may receive the second input operation in the on state of property changeable portion 111.

A third input operation is an input operation for switching the mode of electronic glasses G. Operation input section 12A may receive the third input operation in any of the on state and the off state of property changeable portion 111.

Specifically, the third input operation may include an input operation for switching the mode of electronic glasses G between a manual mode and an automatic mode. The third input operation may include an input operation for switching the learning mode of electronic glasses G between an on state and an off state. The manual mode corresponds to an example of a first mode. The automatic mode corresponds to an example of a second mode.

Of the third input operations, an input operation for switching the mode of electronic glasses G from the manual mode to the automatic mode is referred to as automatic mode execution input operation. When the mode of electronic glasses G is the manual mode, operation input section 12A may receive the automatic mode execution input operation.

Of the third input operations, an input operation for switching the mode of electronic glasses G from the automatic mode to the manual mode is referred to as manual mode execution input operation. When the mode of electronic glasses G is the automatic mode, operation input section 12A may receive the manual mode execution input operation.

Of the third input operations, an input operation for switching the learning mode of electronic glasses G to the on state is referred to as learning mode execution input operation. When the learning mode of electronic glasses G is in the off state, operation input section 12A may receive the learning mode execution input operation.

Of the third input operations, an input operation for switching the learning mode of electronic glasses G to the off state is referred to as learning mode stop input operation. When the learning mode of electronic glasses G is in the on state, operation input section 12A may receive the learning mode stop input operation.

<Power Supply>

Power supplies 13A supply electric power to operation input section 12A, communication section 14A, angle detection section 15A, distance detection section 16A, illuminance detection section 17A, motion detection section 18A, storage section 19A, recognition section 22A, acquisition section 23A, control section 20A, and the like. In the present embodiment, power supplies 13A are rechargeable battery packs detachably held at the other ends (rear ends) of temples 10b, 10c. Power supplies 13A may be the same power supplies as power supplies 13 of Embodiment 1.

<Communication Section>

Communication section 14A communicates with external terminal 5A (described later) through wireless communication. Therefore, communication section 14A may include, for example, a transmitting section and a receiving section (not shown) for information. Communication of communication section 14A with external terminal 5A may be controlled by, for example, control section 20A. Communication section 14A may be the same communication section as communication section 14 of Embodiment 1.

Wireless communication may be Wi-Fi (registered trademark), Bluetooth (registered trademark), wireless LAN, near field communication (NFC), or the like.

Communication section 14A may have a function to communicate with server 7 (described later) via network N. Communication of communication section 14A with server 7 may be controlled by, for example, control section 20A.

Communication section 14A receives information for specifying external terminal 5A (hereinafter, referred to as "medium information") from external terminal 5A. Medium information acquired from external terminal 5A wirelessly connected to electronic glasses G is referred to as usage medium information. Medium information may be information with which external terminal 5A can be identified, for example, the terminal ID, serial number, or the like, of external terminal 5A. Communication section 14A may transmit received medium information to acquisition section 23A.

<Angle Detection Section>

Angle detection section 15A corresponds to an example of a second angle detection section and is, for example, an angle sensor provided in temple 10b of electronic glasses G. Angle detection section 15A may be provided in temple 10c. Angle detection section 15A may be the same angle detection section as angle detection section 15 of Embodiment 1. In other words, the first angle detection section and the second angle detection section may be the same angle detection section.

Angle detection section 15A detects information on the angle of electronic glasses G. Angle detection section 15A may detect the angle of electronic glasses G at predetermined time intervals. Angle detection section 15A may detect, for example, forward tilting angle θ of electronic glasses G with respect to a horizontal direction (see straight line L1 in FIGS. 4A and 4B). For example, as shown in FIG. 4A, forward tilting angle θ in a state where temple 10b of electronic glasses G is parallel to the horizontal direction may be set as a forward tilting angle in a reference state. As shown in FIG. 4B, forward tilting angle θ increases as electronic glasses G tilt forward from the reference state.

In a state where angle θ is 0°, it is determined that a user is facing forward. As angle θ increases, it is determined that the face of the user is facing downward. Angle detection section 15A may transmit a detected value (angle information) to control section 20A. Angle detection section 15A may transmit a detected value (angle information) to storage section 19A.

<Distance Detection Section>

Distance detection section 16A is, for example, a range sensor, such as an infrared range sensor, ultrasonic range sensor, or laser range sensor, provided at front 10a of electronic glasses G. Distance detection section 16A detects distance L (see FIG. 4C) between electronic glasses G and an object facing electronic glasses G in an optical axis direction of lens 11 (hereinafter, simply referred to as "optical axis direction"). Distance detection section 16A may be the same distance detection section as distance detection section 16 of Embodiment 1.

In FIG. 4C, an information medium is external terminal 5A, such as a smartphone and a tablet terminal. In FIG. 4D, an information medium is external terminal 5A, such as a desktop personal computer. The information medium is not limited to the ones shown in FIGS. 4C and 4D. For example, the information medium may be the one not wirelessly connected to electronic glasses G. Specifically, the information medium may be a television, a newspaper, a book, or the like.

For example, distance detection section 16A detects distance L between electronic glasses G and an information medium (specifically, display section 53A of external terminal 5A, a page of a newspaper, or the like) facing electronic glasses G in the optical axis direction. Distance detection section 16A may transmit a detected value (distance information) to control section 20A. Distance detection section 16A may transmit a detected value (distance information) to storage section 19A.

<Illuminance Detection Section>

Illuminance detection section 17A is, for example, an illuminance sensor provided at front 10a of electronic glasses G. Illuminance detection section 17A detects an ambient illuminance Illuminance detection section 17A may transmit a detected value (illuminance information) to control section 20A. Illuminance detection section 17A may transmit a detected value (illuminance information) to storage section 19A. Illuminance detection section 17A may be the same illuminance detection section as illuminance detection section 17 of Embodiment 1.

<Motion Detection Section>

Motion detection section 18A detects that electronic glasses G are moving (that is, a user is moving). Motion detection section 18A is, for example, an angular velocity sensor provided in frame 10 (front 10a, temple 10b, or temple 10c). Motion detection section 18A may transmit a detected value (motion information) to control section 20A. Motion detection section 18A may transmit a detected value (motion information) to storage section 19A. Motion detection section 18A may be the same motion detection section as motion detection section 18 of Embodiment 1.

<Recognition Section>

Recognition section 22A recognizes an information medium facing lenses 11 of electronic glasses G. For example, recognition section 22A may recognize an information medium facing lenses 11 of electronic glasses G based on a detected value of illuminance detection section 17A. Since the brightness of a user-side surface (for example, display section) of an information medium varies between when the information medium is a smartphone, a personal computer, or the like and when the information medium is a newspaper, a book, or the like, a detected value of illuminance detection section 17A also varies. Therefore, recognition section 22A is capable of recognizing the type of an information medium facing lenses 11 of electronic glasses G according to a detected value of illuminance detection section 17A.

As an example, when the information medium is a television, recognition section 22A may recognize the information medium as a television based on a detected value of illuminance detection section 17A and a detected value of distance detection section 16A. Specifically, recognition section 22A may recognize the information medium as a television when a detected value (for example, the brightness of the display section of the information medium) of illuminance detection section 17A is greater than or equal to a predetermined value and a detected value (for example, a distance between electronic glasses G and the display section of the information medium) of distance detection section 16A is greater than or equal to a predetermined value.

Other than the above, recognition section 22A may recognize an information medium facing lenses 11 of electronic glasses G by various methods. Recognition section 22A may transmit information on an recognized information medium (also referred to as usage medium information) to acquisition section 23A.

<Acquisition Section>

Acquisition section 23A acquires information on an information medium. Specifically, acquisition section 23A acquires information on an information medium from recognition section 22A. Acquisition section 23A may acquire information on an information medium (usage medium information), acquired from external terminal 5A by communication section 14A. Acquisition section 23A may transmit acquired information on an information medium to control section 20A.

<Storage Section>

As shown in FIG. 15, storage section 19A may store medium information and angle information (first angle information) detected by angle detection section 15A in association with each other. As shown in FIG. 15, storage section 19A may store medium information and first angle information as a tabular format threshold table. Storage section 19A may be the same storage section as storage section 19 of Embodiment 1.

The first angle information may be a detected value of angle detection section 15A in the case where, in the manual mode, the state of electronic glasses G is switched from the off state to the on state by operation of a user.

The first angle information stored in storage section 19A may be stored for each external terminal 5A. First angle information is also referred to as property change occurrence condition. A property change occurrence condition may be used as a threshold (first threshold) at the time when electronic glasses G are automatically switched to the on state in the automatic mode of electronic glasses G. Storage section 19A may store first angle information in association with information on a user (for example, user ID).

As shown in FIG. 15, storage section 19A may store second angle information in association with medium information. Second angle information is also referred to as property change stop condition. A property change stop condition may be used as a threshold (second threshold) at the time when electronic glasses G are automatically switched to the off state in the automatic mode of electronic glasses G. Storage section 19A may store second angle information in association with information on a user (for example, user ID).

Storage section 19A may store at least one of acquired angle information, distance information, illuminance information, and motion information (hereinafter, referred to as "information on usage status"). Storage section 19A may store information on usage status in association with information on a user (for example, user ID). Storage section 19A may store information on usage status in association with information on electronic glasses G (for example, glass ID). A glass ID is information for identifying electronic glasses G.

Storage section 19A may store at least one of the use start time of external terminal 5A, the use end time of external terminal 5A, and the duration of use of external terminal 5A.

Storage section 19A may store time at which electronic glasses G are set to the on state and/or time at which electronic glasses G are set to the off state in the manual mode. Storage section 19A may store an elapsed time from when electronic glasses G are set to the on state.

Storage section 19A may store acquired information on usage status in association with time at which electronic glasses G are set to the on state and/or an elapsed time from when electronic glasses G are set to the on state.

Storage section 19A may store the duration of the on state of electronic glasses G in the manual mode. Storage section 19A may store a detected value of angle detection section 15A at the time when the on state of electronic glasses G is continuing (hereinafter, simply referred to as "angle information in the on state") in the manual mode. Storage section 19A may store at least one of a mean value, change, median value, mode value, and standard deviation of angle information in the on state.

Storage section 19A may store a detected value of motion detection section 18A just before (a predetermined time before) and/or just after (a predetermined time after) a time point at which the state (on state or off state) of electronic glasses G is switched in the manual mode. Specifically, storage section 19A may store an angular velocity (acceleration) of the motion of the head (for example, a motion to lower the head or a motion to raise the head) of a user within a predetermined time just before and/or just after a time point at which the state of electronic glasses G is switched. For example, when a user switches electronic glasses G to the on state, the user lowers the head at a relatively low velocity. When the user switches electronic glasses G to the off state, the user raises the head at a velocity higher than the velocity at which the user lowers the head at the time of switching electronic glasses G to the on state.

Storage section 19A may store the rhythm of life of a user. Specifically, storage section 19A may store a time period during which a user uses an information medium.

As an example, storage section 19A may store a time period during which a user reads a book, a time period during which a user works with a laptop personal computer, and a time period during which a user browses (reads) a smartphone during a commute. Storage section 19A may incorporate a predetermined offset time into these time periods.

<Control Section>

Control section 20A is electrically connected to the detection pad of operation input section 12A, first electrode 111a, and second electrode 111e via wires 21. Such control section 20A controls the functions of above-described communication section 14A, angle detection section 15A, distance detection section 16A, illuminance detection section 17A, motion detection section 18A, storage section 19A, recognition section 22A, and acquisition section 23A. Control section 20A may be the same control section as control section 20 of Embodiment 1.

Control section 20A may control communication section 14A such that communication section 14A acquires medium information (usage medium information) from external terminal 5A (also referred to as external terminal 5A in use) wirelessly connected to communication section 14A at predetermined timing. Control section 20A may store usage medium information in storage section 19A.

Control section 20A may determine the type of an information medium facing lenses 11 of electronic glasses G (that is, in use by a user) based on information on the information medium, acquired from acquisition section 23A.

Control section 20A may control communication section 14A such that communication section 14A transmits medium information, first angle information, and second angle information (information on the threshold table shown in FIG. 15) for each information medium, stored in storage section 19A, to at least one of external terminal 5A and server 7.

Control section 20A may control communication section 14A such that communication section 14A transmits angle information acquired from angle detection section 15A to external terminal 5A wirelessly connected to electronic glasses G. Control section 20A may control communication section 14A such that communication section 14A transmits angle information and information on a user of electronic glasses G (for example, user ID) to external terminal 5A.

Control section 20A may control communication section 14A such that communication section 14A transmits angle information acquired from angle detection section 15A to server 7 connected to electronic glasses G. Control section 20A may control communication section 14A such that communication section 14A transmits angle information and information on a user of electronic glasses G (for example, user ID) to server 7.

Control section 20A may control communication section 14A such that communication section 14A transmits at least one of acquired angle information, distance information, illuminance information, and motion information (information on usage status) to server 7 connected for communication to electronic glasses G via network N. Control section 20A may incorporate information on a user of electronic glasses G (for example, user ID) into information on usage status.

Control section 20A may incorporate information on electronic glasses G (for example, glass ID) into information on usage status. Information on usage status may be information acquired from angle detection section 15A, distance detection section 16A, illuminance detection section 17A, and motion detection section 18A. Information on usage status may be information stored in storage section 19A.

Hereinafter, the function of control section 20A, realized for each mode of electronic glasses G, will be described.

<Function of Control Section in Manual Mode>

When the mode of electronic glasses G is the manual mode, control section 20A may set electronic glasses G to the on state when operation input section 12A receives the above-described first input operation. Control section 20A may set electronic glasses G to the off state when operation input section 12A receives the above-described second input operation.

When operation input section 12A receives the manual mode execution input operation, control section 20A may switch the mode of electronic glasses G from the automatic mode to the manual mode.

When operation input section 12A receives the automatic mode execution input operation, control section 20A may switch the mode of electronic glasses G from the manual mode to the automatic mode.

When the mode of electronic glasses G is the manual mode and the learning mode is in the off state (hereinafter, referred to as "first manual mode"), control section 20A may switch the learning mode from the off state to the on state when operation input section 12A receives the learning mode execution input operation.

When the mode of electronic glasses G is the manual mode and the learning mode is in the on state (hereinafter, referred to as "second manual mode"), control section 20A may switch the learning mode from the on state to the off state when operation input section 12A receives the learning mode stop input operation.

When the mode of electronic glasses G is the second manual mode, control section 20A may control communication section 14A such that communication section 14A receives usage medium information from external terminal 5A. Control section 20A may acquire the usage medium information received by communication section 14A. Control section 20A may acquire usage medium information from storage section 19A.

When the mode of electronic glasses G is the second manual mode, control section 20A may acquire information on an information medium (usage medium information) from acquisition section 23A.

When the mode of electronic glasses G is the second manual mode, control section 20A may control angle detection section 15A such that angle detection section 15A detects the angle of electronic glasses G (frame 10) when operation input section 12A receives the above-described first input operation. Control section 20A may acquire a detected value of angle detection section 15A. Then, control section 20A may store angle information acquired from angle detection section 15A in storage section 19A in association with usage medium information acquired from external terminal 5A or acquisition section 23A. When medium information corresponding to usage medium information and angle information associated with the medium information are already stored in storage section 19A, control section 20A may update the angle information (see the first angle information of FIG. 15) stored in storage section 19A with a detected value (latest angle information) of angle detection section 15A. Such a control process is referred to as automatic learning control.

When the mode of electronic glasses G is the second manual mode, a user may set a reference value of the above-described first angle information (hereinafter, referred to as "first reference value") by performing an operation (for example, long press for five seconds in the off state) to operation input section 12A. When the mode of electronic glasses G is the second manual mode, a user may set a reference value of the above-described second angle information (hereinafter, referred to as "second reference value") by performing an operation (for example, long press for five seconds in the on state) to operation input section 12A.

When the mode of electronic glasses G is the second manual mode, the above-described automatic learning control may be executed within a predetermined range including the first reference value. As an example, the predetermined range may be a range of plus or minus 10 degrees from the first reference value. When the predetermined range is set and a detected value of angle detection section 15A at the time when operation input section 12A receives the first input operation falls within the predetermined range, control section 20A may update angle information stored in storage section 19A with the detected value (latest angle information) of angle detection section 15A.

<Function of Control Section in Automatic Mode>

When the mode of electronic glasses G is the automatic mode, control section 20A may set or does not need to set electronic glasses G to the on state when operation input section 12A receives the first input operation. Control section 20A may set or does not need to set electronic glasses G to the off state when operation input section 12A receives the second input operation.

When the mode of electronic glasses G is the automatic mode, control section 20A may acquire, from storage section 19A, first angle information (see FIG. 15) corresponding to information on an information medium acquired from acquisition section 23A. As an example, when the information medium is external terminal 5A connected for communication to electronic glasses G, control section 20A may acquire, from storage section 19A, first angle information (see FIG. 15) corresponding to usage medium information acquired via communication section 14A from external terminal 5A in use.

As an example, when the information medium is a television, a newspaper, a book, or the like, control section 20A may acquire, from storage section 19A, first angle information (see FIG. 15) corresponding to information on the information medium recognized by recognition section 22A.

Control section 20A may set acquired first angle information for a threshold at the time of automatically switching electronic glasses G from the off state to the on state (first threshold) in the automatic mode. Control section 20A may acquire first angle information from external terminal 5A or server 7.

When the mode of electronic glasses G is the automatic mode, control section 20A may acquire, from storage section 19A, second angle information (see FIG. 15) corresponding to information on an information medium, acquired from acquisition section 23A. As an example, when the information medium is external terminal 5A connected for communication to electronic glasses G, control section 20A may acquire, from storage section 19A, second angle information (see FIG. 15) corresponding to usage medium information acquired via communication section 14A from external terminal 5A in use.

As an example, when the information medium is a newspaper, a book, or the like, control section 20A may acquire, from storage section 19A, second angle information (see FIG. 15) corresponding to information on an information medium recognized by recognition section 22A.

Control section 20A may set acquired second angle information for a threshold at the time of automatically switching electronic glasses G from the on state to the off state (second threshold) in the automatic mode. Control section 20A may acquire second angle information from external terminal 5A or server 7.

When a detected value of angle detection section 15A satisfies a predetermined condition (also referred to as first predetermined condition) in relation with the first threshold, control section 20A may automatically set electronic glasses G to the on state. The predetermined condition may be, for example, a case where a detected value of angle detection section 15A is equal to the first threshold. The predetermined condition may be, for example, a case where a detected value of angle detection section 15A is greater than or equal to the first threshold.

The predetermined condition may be, for example, a case where a detected value of angle detection section 15A falls within a predetermined range including the first threshold. The predetermined range may be a range of plus or minus one degree from the first threshold.

When a detected value of angle detection section 15A satisfies a predetermined condition in relation with the first threshold and a detected value of the motion detection section 18A satisfies a predetermined condition, control section 20A may automatically set electronic glasses G to the on state. The case where a detected value of the motion detection section 18A satisfies a predetermined condition may be, for example, a case where the acceleration (angular velocity) of up and down motion of the head of a user is greater than or equal to a first threshold of acceleration.

When a detected value of angle detection section 15A satisfies a predetermined condition (also referred to as second predetermined condition) in relation with the second threshold, control section 20A may automatically set electronic glasses G to the off state. The predetermined condition may be, for example, a case where a detected value of angle detection section 15A is equal to the second threshold. The predetermined condition may be, for example, the case where a detected value of angle detection section 15A is less than equal to the second threshold. The predetermined condition may be, for example, a case where a detected value of angle detection section 15A falls within a predetermined range including the second threshold. The predetermined range may be a range of plus or minus one degree from the second threshold.

When a detected value of angle detection section 15A satisfies a predetermined condition in relation with the second threshold and a detected value of the motion detection section 18A satisfies a predetermined condition, control section 20A may automatically set electronic glasses G to the off state. The case where a detected value of the motion detection section 18A satisfies a predetermined condition may be, for example, a case where the acceleration (angular velocity) of up and down motion of the head of a user is greater than or equal to a second threshold of acceleration. As an example, the first threshold of acceleration may be less than the second threshold of acceleration.

The above-described functions implemented by control section 20A may be realized by an integrated circuit or realized by control section 20A reading and executing a program stored in storage section 19A.

A CPU that functions as control section 20A may control operations of the above-described functional sections by reading a program for executing the above-described functions from a ROM that functions as storage section 19A, expanding the program onto a RAM, and executing the expanded program. The hardware configuration of electronic glasses G is similar to the hardware configuration of electronic glasses G according to above-described Embodiment 1. Therefore, the description of the hardware configuration of electronic glasses G is omitted. Electronic glasses G may include a detection section that acquires body information, such as the heart rate and blood flow of a user, which is not shown in the drawing.

<Timing of Data Transmission to Server>

Hereinafter, a method of transmitting information on usage status of electronic glasses G to server 7 will be described.

A first transmission method is a method in which, each time information on usage status (angle information, distance information, illuminance information, motion information, and the like) is detected in electronic glasses G, electronic glasses G transmit the detected information on usage status to server 7.

A second transmission method is a method in which electronic glasses G transmit information on usage status, stored in storage section 19A, to server 7 at predetermined timing. The predetermined timing may be, for example, timing at which electronic glasses G switch from the on state to the off state, timing at which electronic glasses G switch from the off state to the on state, or timing at which a state where electronic glasses G are not used (for example, a state where angle information, illuminance information, motion information, and the like, that are information on usage status of electronic glasses G have not changed for a certain time) has continued for a certain time.

A third transmission method is a method of transmitting information on usage status to server 7 via external terminal 5A. Electronic glasses G may transmit information on usage status to external terminal 5A at predetermined timing. External terminal 5A may transmit received information on usage status to server 7 at predetermined timing.

Figure 13:
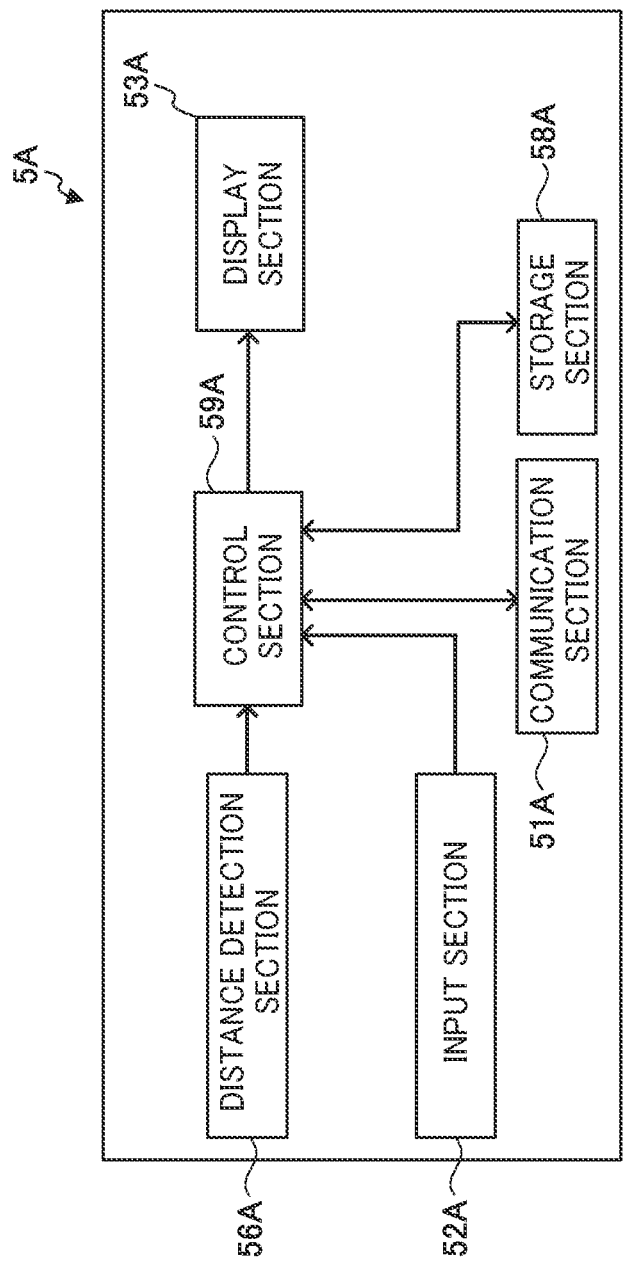
FIG. 13 is a block diagram showing an example of the configuration of an external terminal.

Each time external terminal 5A receives information on usage status from electronic glasses G, external terminal 5A may transmit the information on usage status to server 7. Alternatively, external terminal 5A may store received information on usage status in storage section 58A (see FIG. 13) and transmit the information on usage status, stored in storage section 58A, to server 7 at predetermined timing.

A fourth transmission method is a method of transmitting information on usage status to server 7 via a charger (not shown) that has a function to communicate with server 7 and a function to supply power to electronic glasses G. In the case of the fourth transmission method, information on usage status of electronic glasses G may be transmitted to server 7 via a communication section of the charger at the time when electronic glasses G are charged by the charger.

<External Terminal>

External terminal 5A includes communication section 51A, input section 52A, display section 53A, distance detection section 56A, storage section 58A, control section 59A, and the like.

External terminal 5A is a smartphone, a tablet terminal, a desktop computer, a laptop computer, or the like.

Communication section 51A communicates with electronic glasses G through wireless communication. Communication section 51A may communicate with server 7 via network N. Therefore, communication section 51A may include, for example, a transmitting section and a receiving section (not shown) for information. Communication of communication section 51A with electronic glasses G and server 7 may be controlled by, for example, control section 59A.

<Information to Be Transmitted by Communication Section>

Communication section 51A may transmit medium information for specifying external terminal 5A to electronic glasses G in response to a request from electronic glasses G.

On the condition that communication section 51A is wirelessly connected to electronic glasses G, communication section 51A may transmit medium information for specifying external terminal 5A to electronic glasses G.

Communication section 51A may transmit the above-described first angle information to electronic glasses G in response to a request from electronic glasses G.

Communication section 51A may transmit the above-described second angle information to electronic glasses G in response to a request from electronic glasses G.

Communication section 51A may transmit information (angle information, medium information, information on a user, and the like) acquired from electronic glasses G to server 7 (described later).

<Information to Be Received by Communication Section>

Communication section 51A may receive angle information (first angle information) from electronic glasses G. Communication section 51A may receive information on a user from electronic glasses G. Communication section 51A may transmit information received from electronic glasses G to control section 59A.

<Input Section>

Input section 52A receives input of information. For example, input information from a user is received by input section 52A and is input to control section 59A.

<Display Section>

Display section 53A displays information. Information to be displayed on display section 53A may be, for example, information stored in storage section 58A or may be information generated by control section 59A.

Input section 52A and display section 53A may be made up of individual devices or may be made up of an integrated device capable of inputting and outputting (displaying) information in parallel like, for example, a touch panel display.

<Distance Detection Section>

Distance detection section 56A detects a distance between external terminal 5A and an object (the face of a user, electronic glasses G, or the like) facing external terminal 5A based on acquired image information. Distance detection section 56A may transmit a detected value (distance information) to control section 59A. A method of detecting a distance, which is performed by distance detection section 56A, may be a known method.

<Storage Section>

Storage section 58A stores medium information of external terminal 5A. Storage section 58A may store first angle information acquired from electronic glasses G in association with medium information (see FIG. 15). Storage section 58A may store second angle information acquired from electronic glasses G in association with medium information (see FIG. 15). Storage section 58A may store medium information, first angle information, and second angle information in association with information on a user (for example, user ID).

<Control Section>

Control section 59A controls, for example, the operations of the elements of above-described external terminal 5A.

Control section 59A may control communication section MA such that communication section 51A transmits medium information to electronic glasses G. For example, when there is a request from electronic glasses G, control section 59A may control communication section 51A such that communication section 51A transmits medium information to electronic glasses G. Alternatively, on the condition that external terminal 5A and electronic glasses G are connected for communication (for example, pairing), control section 59A may control communication section 51A such that communication section 51A transmits medium information to electronic glasses G.

Control section 59A may control the display status of display section 53A by giving display section 53A a display control signal according to information to be displayed on display section 53A. Control section 59A corresponds to an example of a display control section.

When control section 59A has acquired distance information from distance detection section 56A, control section 59A may control communication section 51A such that communication section 51A transmits acquired distance information to electronic glasses G.

[Hardware Configuration of External Terminal]

Figure 14:
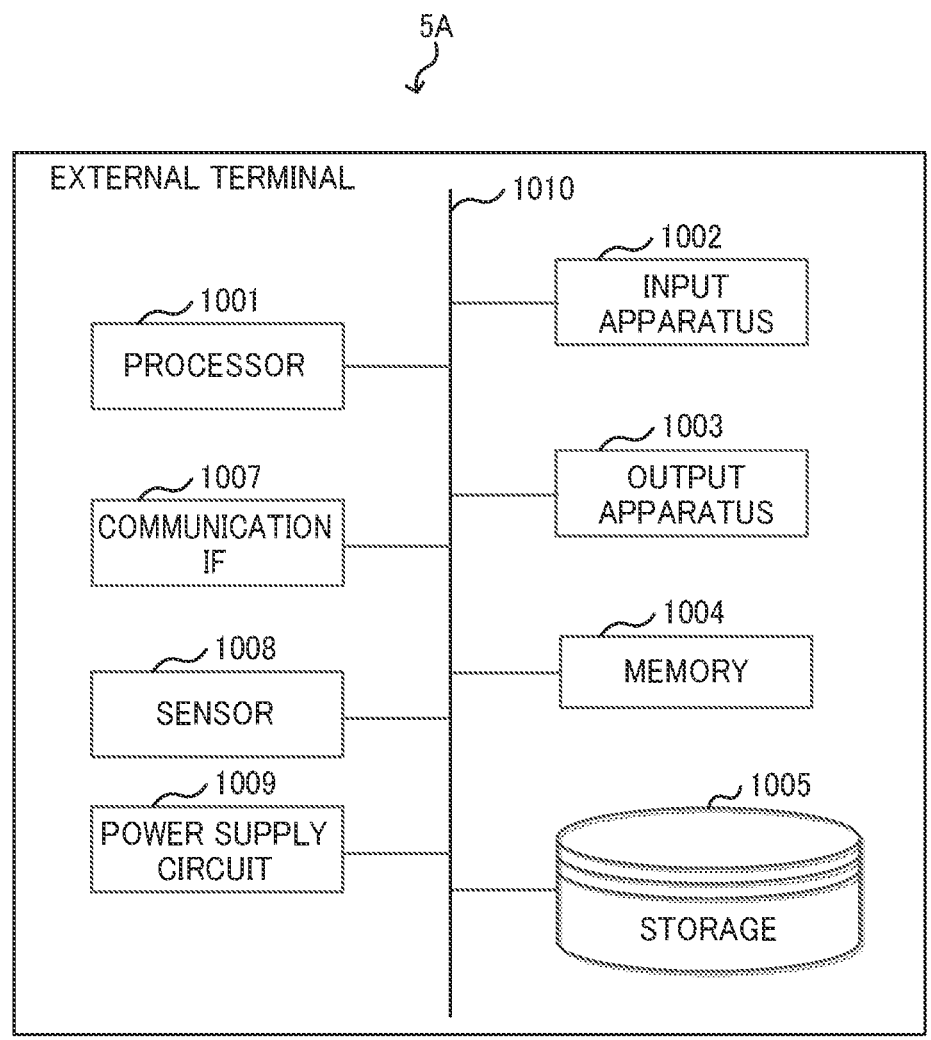
FIG. 14 is a block diagram showing the hardware configuration of the external terminal.

As shown in FIG. 14, external terminal 5A, when focusing on hardware configuration, includes, for example, processor 1001, input apparatus 1002, output apparatus 1003, memory 1004, and storage 1005. External terminal 5A may include communication interface (IF) 1007, sensor 1008, and power supply circuit 1009. These elements 1001 to 1005, and 1007 to 1009 may be connected by, for example, bus 1010. Such elements 1001 to 1005, and 1007 to 1009 of external terminal 5A are substantially similar to elements 1001 to 1005, and 1007 to 1009 of external terminal 5 of above-described Embodiment 1. Therefore, the description of the hardware configuration of external terminal 5A is omitted. External terminal 5A, as well as external terminal 5 of Embodiment 1, may include image pickup apparatus 1006.

<Server>

As shown in FIG. 7, server 7 includes communication section 71, storage section 72, control section 73, and the like. The hardware configuration of the server 7 is substantially similar to the hardware configuration of above-described external terminal 5A.

<Communication Section>

Communication section 71 communicates with electronic glasses G and/or external terminal 5A via network N (for example, the Internet). Communication of communication section 71 with electronic glasses G and/or external terminal 5A may be wire communication or may be performed partially via wireless communication. Therefore, communication section 71 may include a transmitting section, a receiving section (not shown), and the like for information. Communication with electronic glasses G and/or external terminal 5A may be controlled by control section 73.

Communication section 71 may receive at least one of first angle information, second angle information, medium information from electronic glasses G. Communication section 71 may transmit received first angle information, second angle information, and medium information to control section 73.

<Storage Section>

Storage section 72 may store acquired first angle information in association with acquired medium information (see FIG. 15). Storage section 72 may store acquired second angle information in association with acquired medium information (see FIG. 15).

Storage section 72 may store first angle information and medium information in association with information on a user (for example, user ID). Storage section 72 may store second angle information and medium information in association with information on a user (for example, user ID). Storage section 72 may store first angle information and medium information in association with each piece of information on electronic glasses (for example, glass ID).

<Operation of Electronic Glasses: Manual Mode>

Next, an example of the operation of electronic glasses G in the manual mode will be described. In the manual mode, electronic glasses G switch property changeable portion 111 between the on state and the off state based on an input operation of a user (for example, the first input operation and the second input operation).

Initially, the off state of property changeable portion 111 of electronic glasses will be described. In the off state of electronic glasses G, the refractive index of liquid crystal module 111c is substantially equal to the refractive indices of first substrate 110 and second substrate 112 in first region 11a of lens 11. Therefore, in property changeable portion 111, no lens effect caused by liquid crystal module 111c occurs. Therefore, in lens 11, the optical power of first region 11a is substantially equal to the optical power of second region 11b.

In the off state of electronic glasses G, when operation input section 12A receives the above-described first input operation, a change in capacitance based on the first input operation is detected by the detection pad of operation input section 12A. Detection information based on the first input operation is transmitted to control section 20A. Control section 20A switches property changeable portion 111 from the off state to the on state based on the acquired detection information of operation input section 12A.

Thus, alignment of the liquid crystal material in liquid crystal module 111c of property changeable portion 111 changes, and the refractive index of liquid crystal module 111c changes (set to the on state).

In the on state of electronic glasses G, the refractive index of liquid crystal module 111c is different from the refractive indices of first substrate 110 and second substrate 112. Therefore, in first region 11a, a lens effect caused by liquid crystal module 111c occurs. As a result, the optical power of first region 11a changes.

In the on state of electronic glasses G, when operation input section 12A receives the second input operation, control section 20A stops application of a voltage to property changeable portion 111. Thus, alignment of the liquid crystal material in liquid crystal module 111c returns to the state before voltage application, and property changeable portion 111 switches from the on state to the off state.

As described above, electronic glasses G according to the present embodiment are capable of changing the optical power of first region 11a of lens 11 by detecting the contact of the finger of a user.

<Operation of Electronic Glasses: Automatic Mode>

Next, an example of the operation of electronic glasses G in the automatic mode will be described with reference to FIGS. 16A to 16C. In the automatic mode, electronic glasses G switch the state (on state or off state) of property changeable portion 111 based on medium information and angle information (first angle information and second angle information) stored in storage section 19A.

Figure 16A:
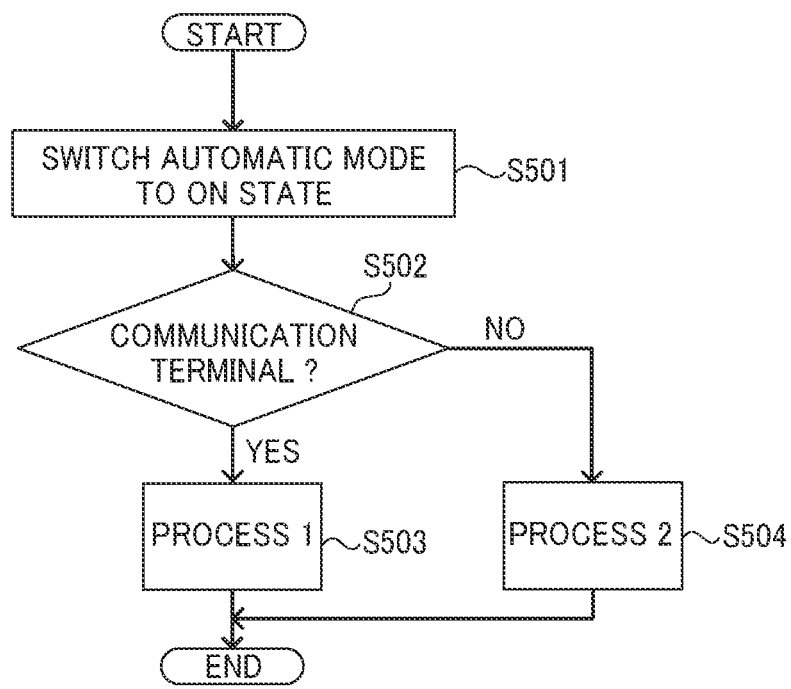
FIG. 16A is a flowchart showing the operations of electronic glasses G in an automatic mode.
Figure 16B:
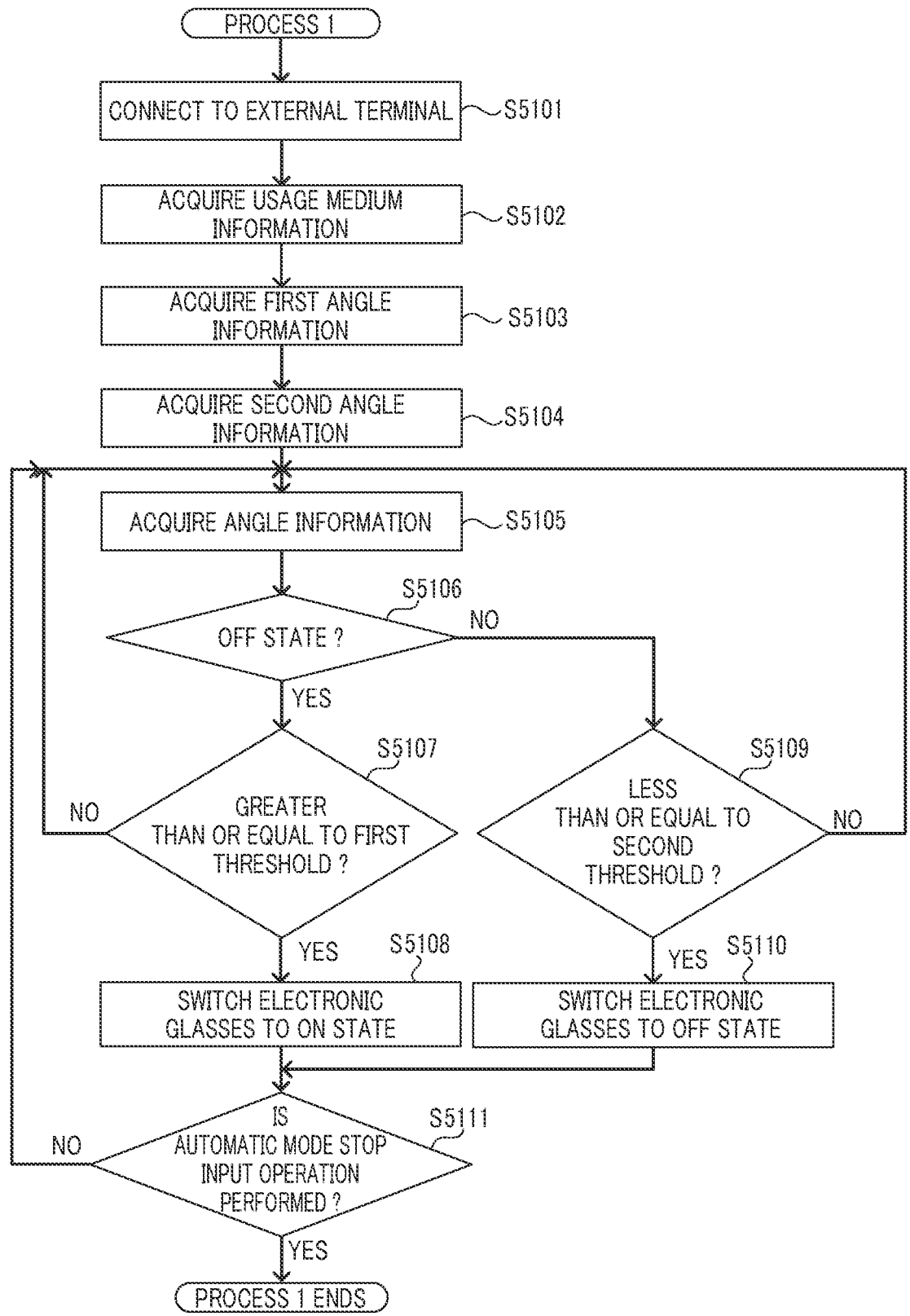
FIG. 16B is a flowchart of Process 1 of FIG. 16A.
Figure 16C:
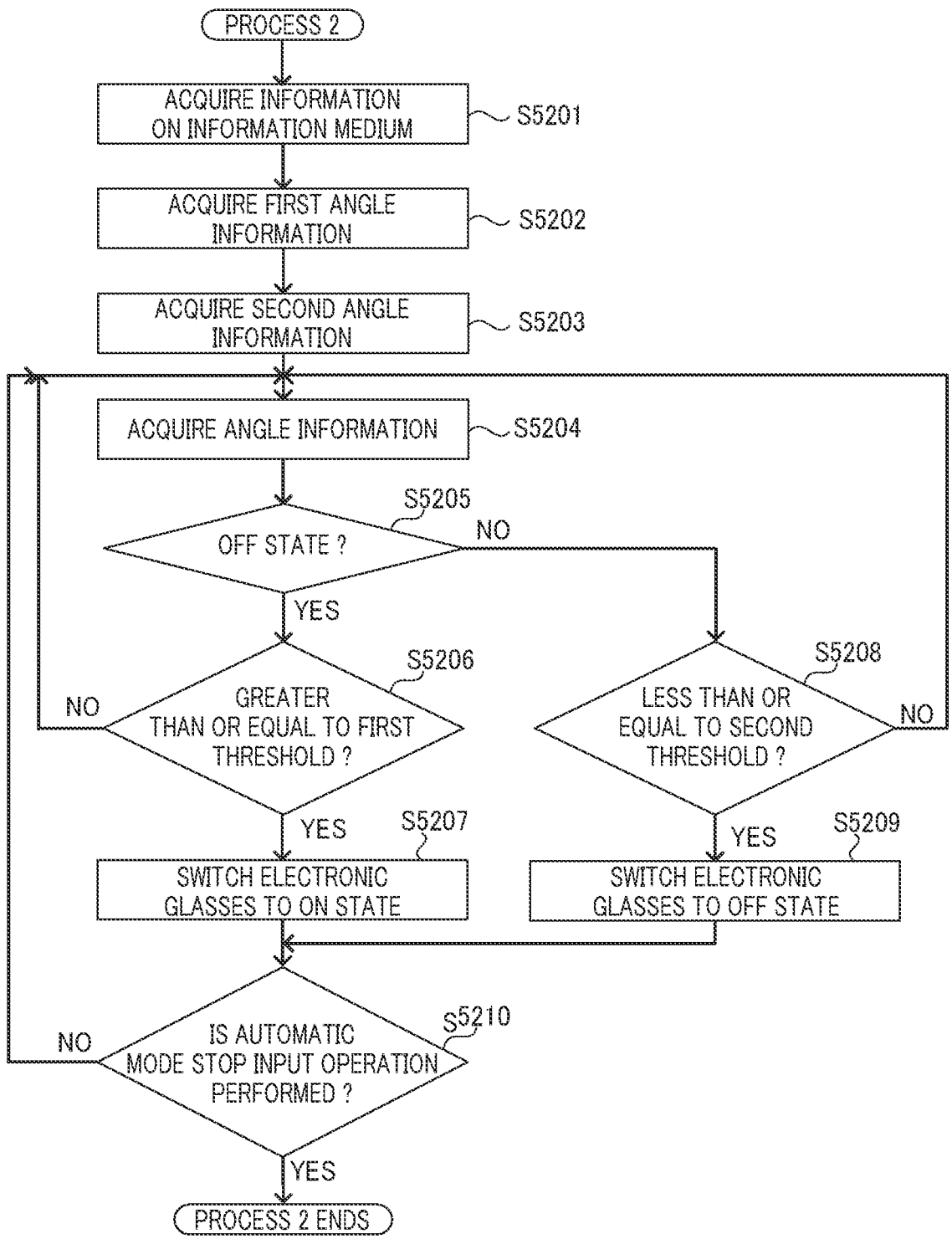
FIG. 16C is a flowchart of Process 2 of FIG. 16A.

The operations of electronic glasses G in the automatic mode, shown in FIGS. 16A to 16C, may be realized by control section 20A (CPU) reading a program for realizing a process in the automatic mode from storage section 19A (ROM), expanding the program onto a RAM, and executing the expanded program.

Initially, in step S501 of FIG. 16A, a user inputs the automatic mode execution input operation to operation input section 12A. When operation input section 12A receives the automatic mode execution input operation, control section 20A switches the mode of electronic glasses G to the automatic mode.

Subsequently, in step S502 of FIG. 16A, control section 20A determines whether the information medium in use by the user is a communication terminal connected for communication to electronic glasses G. A method of determining whether the information medium is a communication terminal is not limited. Control section 20A may determine whether the information medium is a communication terminal based on, for example, the result of communication between electronic glasses G and the information medium.

When the information medium is a communication terminal in step S502 ("YES" in step S502), the control process proceeds to step S503 (Process 1). On the other hand, when the information medium is not a communication terminal in step S502 ("NO" in step S502), the control process proceeds to step S504 (Process 2).

<Process 1>

Hereinafter, Process 1 to be executed in step S503 of FIG. 16A will be described with reference to FIG. 16B.

Initially, in step S5101, electronic glasses G and external terminal 5A are wirelessly connected. The control process of step S5101 may be executed based on an input operation of the user. Alternatively, the control process of step S5101 may be automatic control by control section 20A. When, for example, control section 20A detects that electronic glasses G and external terminal 5A can be wirelessly connected to each other, control section 20A may connect electronic glasses G and external terminal 5A. When electronic glasses G and external terminal 5A are wirelessly connected in step S5101, step S5101 may be omitted.

Subsequently, in step S5102 of FIG. 16B, control section 20A controls communication section 14A such that communication section 14A acquires usage medium information from external terminal 5A. As a result, in step S5102, communication section 14A acquires usage medium information (information on an information medium) from external terminal 5A.

Subsequently, in step S5103 of FIG. 16B, control section 20A acquires, from storage section 19A, first angle information corresponding to the usage medium information acquired in step S5102. Then, control section 20A sets the acquired first angle information for the first threshold.

Subsequently, in step S5104 of FIG. 16B, control section 20A acquires, from storage section 19A, second angle information corresponding to the usage medium information acquired in step S5102. Then, control section 20A sets the acquired second angle information for the second threshold.

Subsequently, in step S5105 of FIG. 16B, control section 20A controls angle detection section 15A such that angle detection section 15A acquires angle information of electronic glasses G (frame 10). In step S5105, angle detection section 15A acquires angle information (hereinafter, referred to as usage angle information") of electronic glasses G (frame 10). Angle detection section 15A may acquire usage angle information continuously or may acquire usage angle information discretely (at predetermined time intervals).

Subsequently, in step S5106 of FIG. 16B, control section 20A determines whether electronic glasses G are in the off state. Even when electronic glasses G (property changeable portion 111) are in the off state, automatic mode control shown in FIG. 16B is executed. When electronic glasses G are in the off state in step S5106 ("YES" in step S5106), the control process proceeds to step S5107. On the other hand, when electronic glasses G are not in the off state in step S5106 ("NO" in step S5106), the control process proceeds to step S5109.

Subsequently, in step S5107, control section 20A compares the usage angle information with the first threshold. When the usage angle information is greater than or equal to the first threshold in step S5107 ("YES" in step S5107), the control process proceeds to step S5108.

As a modification, when the usage angle information is equal to the first threshold in step S5107 ("YES" in step S5107), the control process may proceed to step S5108. In the case of the modification, when the difference between the usage angle information and the first threshold falls within a predetermined range, it may be regarded that the usage angle information is equal to the first threshold. The predetermined range may be a range of plus or minus offset amount from the first threshold. The offset amount may be automatically set based on statistical information, such as standard deviation. The magnitude of the offset amount may be selected by a user from among, for example, "narrow", "regular", and "wide". When the usage angle information is not greater than or equal to the first threshold in step S5107 ("NO" in step S5107), the control process proceeds to step S5105.

Subsequently, in step S5108, control section 20A switches electronic glasses G from the off state to the on state.

In S5109 to which the control process proceeds from step S5106, control section 20A compares the usage angle information with the second threshold. When the usage angle information is less than or equal to the second threshold in step S5109 ("YES" in step S5109), the control process proceeds to step S5110.

As a modification, when the usage angle information is equal to the second threshold in step S5109 ("YES" in step S5109), the control process may proceed to step S5110. In the case of the modification, when the difference between the usage angle information and the second threshold falls within a predetermined range, it may be regarded that the usage angle information is equal to the second threshold. When the usage angle information is not less than or equal to the second threshold in step S5109 ("NO" in step S5109), the control process proceeds to step S5105.

Subsequently, in step S5110, control section 20A switches electronic glasses G from the on state to the off state.

Subsequently, in step S5111, control section 20A determines whether an input operation to turn off the automatic mode of electronic glasses G (hereinafter, referred to as "automatic mode stop input operation") is input. When the automatic mode stop input operation is input in step S5111 ("YES" in step S5111), the control process ends. On the other hand, when the automatic mode stop input operation is not input in step S5111 ("NO" in step S5111), the control process proceeds to step S5105.

<Process 2>

Hereinafter, Process 2 to be executed in step S504 of FIG. 16A will be described with reference to FIG. 16C.

Initially, in step S5201, control section 20A acquires information on an information medium (usage medium information) from acquisition section 23A. Usage medium information to be acquired in step S5201 is information on an information medium recognized by recognition section 22A.

Step S5202 to step S5210 of FIG. 16C are similar to step S5103 to step S5111 shown in FIG. 16B. Therefore, the description about step S5202 to step S5210 of FIG. 16C is omitted.

<Automatic Learning Control for Electronic Glasses>

Figure 17A:
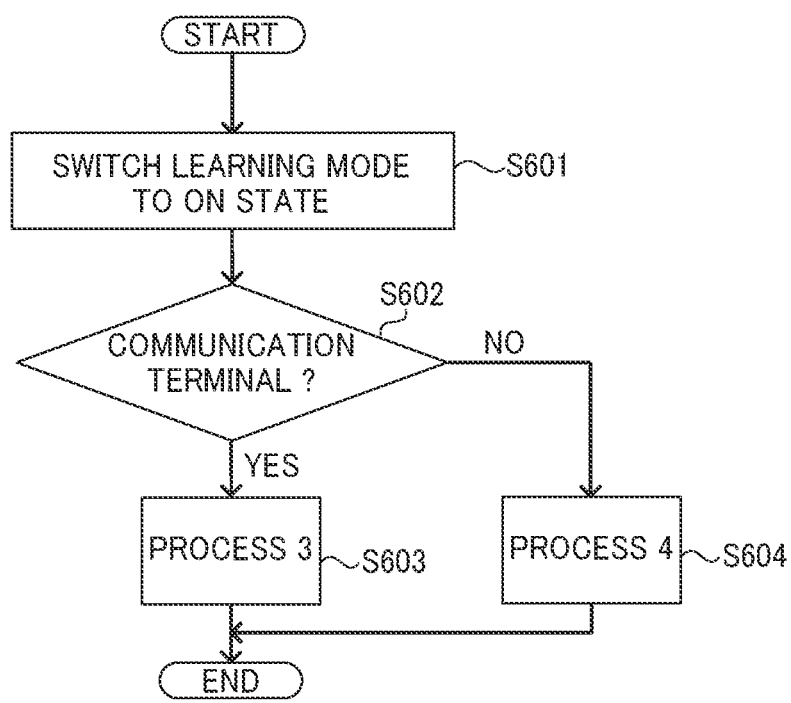
FIG. 17A is a flowchart of automatic learning control.
Figure 17B:
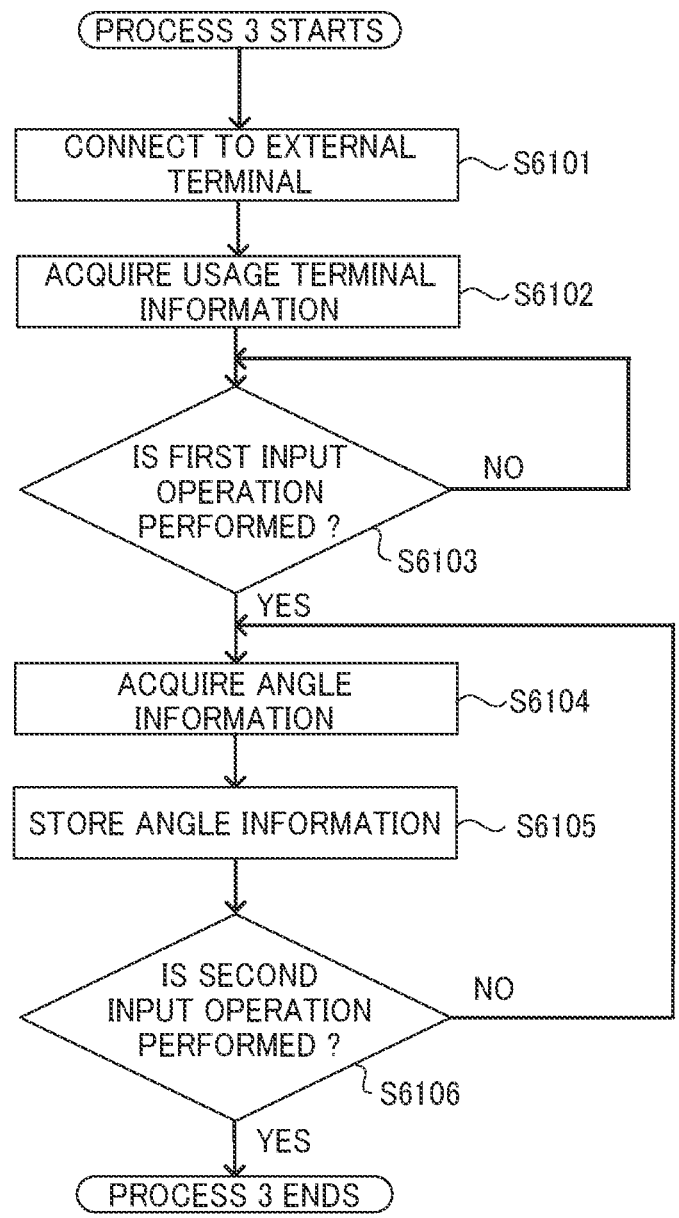
FIG. 17B is a flowchart of Process 3 of FIG. 17A.
Figure 17C:
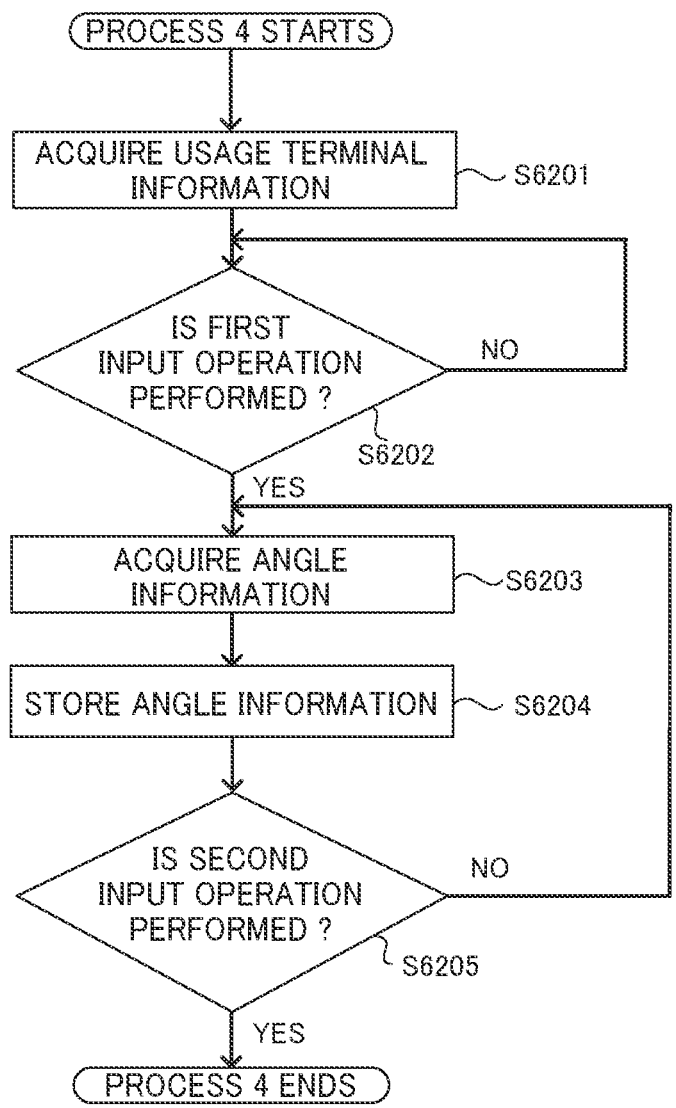
FIG. 17C is a flowchart of Process 4 of FIG. 17A.

Next, automatic learning control for electronic glasses G will be described with reference to FIG. 17A to FIG. 17C. FIG. 17A to FIG. 17C are flowcharts of automatic learning control for electronic glasses G. Automatic learning control for electronic glasses G is a process for optimizing a threshold at the time of automatically setting electronic glasses G to the on state in the automatic mode in relation with external terminal 5A wirelessly connected to electronic glasses G. Automatic learning control shown in FIG. 17A to FIG. 17C is executed when the learning mode is set to the on state based on an input operation of a user.

Initially, in step S601 of FIG. 17A, the user inputs the learning mode execution input operation from operation input section 12A. As a result, operation input section 12A receives the learning mode execution input operation. When operation input section 12A receives the learning mode execution input operation, control section 20A sets the learning mode to the on state.

Subsequently, in step S602 of FIG. 17A, control section 20A determines whether the information medium in use by the user is a communication terminal connected for communication to electronic glasses G. A method of determining whether the information medium is a communication terminal is not limited. Control section 20A may determine whether the information medium is a communication terminal based on, for example, the result of communication between electronic glasses G and the information medium.

When the information medium is a communication terminal in step S602 ("YES" in step S602), the control process proceeds to step S603 (Process 3). On the other hand, when the information medium is not a communication terminal in step S602 ("NO" in step S602), the control process proceeds to step S604 (Process 4).

<Process 3>

Hereinafter, Process 3 to be executed in step S603 of FIG. 17A will be described with reference to FIG. 17B.

Initially, in step S6101, electronic glasses G and external terminal 5A are wirelessly connected. The control process of step S6101 may be executed based on an input operation of the user. Alternatively, the control process of step S6101 may be automatic control by control section 20A. When, for example, control section 20A detects that electronic glasses G and external terminal 5A can be wirelessly connected to each other, control section 20A may automatically connect electronic glasses G and external terminal 5A. When electronic glasses G and external terminal 5A have been wirelessly connected in step S6101, step S6101 may be omitted.

When there is a plurality of external terminals 5A that can be connected to electronic glasses G in step S6101, the user may select external terminal 5A to be connected to electronic glasses G. The user may select the external terminal to be connected to electronic glasses G by operating operation input section 12A of electronic glasses G. Of external terminals 5A registered in electronic glasses G in advance, the external terminal facing forward of electronic glasses G may be automatically selected as the external terminal to be connected to electronic glasses G. The external terminal to be connected to electronic glasses G may be selected based on the intensity of a signal transmitted by the external terminal, a detected value of the sensor (for example, an acceleration sensor, a distance sensor, or the like) of the external terminal, image information of the image pickup apparatus of the external terminal, or the like.

Subsequently, in step S6102 of FIG. 17B, control section 20A controls communication section 14A such that communication section 14A acquires usage medium information from external terminal 5A. As a result, in step S6102, communication section 14A acquires usage medium information from external terminal 5A.

Subsequently, in step S6103 of FIG. 17B, control section 20A determines whether the first input operation is input by the user. In other words, in step S6103, control section 20A determines whether electronic glasses G have switched from the off state to the on state based on an input operation of the user.

When the first input operation is not input in step S6103 ("NO" in step S6103), the control process proceeds to step S6103.

On the other hand, when the first input operation is input in step S6103 ("YES" in step S6103), the control process proceeds to step S6104.

Subsequently, in step S6104 of FIG. 17B, control section 20A controls angle detection section 15A such that angle detection section 15A detects angle information of electronic glasses G (frame 10). As a result, angle detection section 15A detects angle information of electronic glasses G (frame 10) in step S6104. When electronic glasses G are set to the off state within a predetermined time (for example, five seconds) from when electronic glasses G are set to the on state in step S6103, a detected value detected by angle detection section 15A in step S6104 may be handled as a detected value based on an erroneous operation of the user. In this case, the control process proceeds to step S6103, which is not shown in the drawing.

Subsequently, in step S6105 of FIG. 17B, control section 20A controls storage section 19A such that storage section 19A stores the acquired angle information in association with the usage medium information acquired in step S6102. As a result, storage section 19A stores the acquired angle information in association with the usage medium information in step S6105.

When storage section 19A has stored medium information corresponding to the usage medium information and angle information (first angle information) corresponding to the usage medium information in step S6105, storage section 19A may update the stored angle information (first angle information) with the latest angle information (that is, the angle information acquired in step S6105).

When step S6104 is executed multiple times, control section 20A may control storage section 19A such that storage section 19A stores, for example, angle information detected at the highest frequency in a period from when electronic glasses G are set to the on state to when electronic glasses G are set to the off state, of the acquired pieces of angle information, in association with the usage medium information acquired in step S6102. In this case, the process of step S6104 may be executed after step S6106 of FIG. 17B.

Subsequently, in step S6106 of FIG. 17B, control section 20A determines whether the second input operation is input. In other words, in step S6106, control section 20A determines whether electronic glasses G have switched from the on state to the off state based on an input operation of the user.

When the second input operation is input in step S6106 ("YES" in step S6106), automatic learning control ends. On the other hand, when the second input operation is not input in step S6106 ("NO" in step S6106), the control process proceeds to step S6104.

In the flowchart shown in FIG. 17B, after control section 20A acquires angle information in step S6104, control section 20A may control communication section 14A such that communication section 14A transmits the acquired angle information to external terminal 5A and/or server 7 at predetermined timing. Control section 20A may transmit angle information to external terminal 5A and/or server 7 in a process different from automatic learning control shown in FIG. 17B. A transmitting method is as described above.

<Process 4>

Hereinafter, Process 4 to be executed in step S604 of FIG. 17A will be described with reference to FIG. 17C.

Initially, in step S6201, control section 20A acquires information on an information medium (usage medium information) from acquisition section 23A. The usage medium information to be acquired in step S6201 is information on an information medium recognized by recognition section 22A.

Step S6202 to step S6205 of FIG. 17C are similar to step S6103 to step S6106 shown in FIG. 17B. Therefore, the description about step S6202 to step S6205 of FIG. 17C is omitted.

Operation and Advantageous Effects

According to the above-described present embodiment, in the automatic mode of electronic glasses G, control according to external terminal 5A wirelessly connected to electronic glasses G is executed.

In other words, in the case of the present embodiment, in the automatic mode of electronic glasses G, the threshold (first threshold) at the time of automatically setting electronic glasses G to the on state and the threshold (second threshold) at the time of automatically setting electronic glasses G to the off state may be set according to wirelessly connected external terminal 5A. Therefore, control suitable for external terminal 5A used by a user is possible.

Electronic glasses G store the first threshold (first angle information) and the second threshold (second angle information) for each external terminal 5A in storage section 19A. Then, when the learning mode of electronic glasses G is in the on state, control section 20A updates the first angle information stored in storage section 19A with newly acquired first angle information. Thus, the first angle information for each external terminal 5A, stored in storage section 19A, can be maintained at the latest angle information. As a result, electronic glasses G are able to realize the on state at timing appropriate for a user in the automatic mode.

The disclosure of Japanese Patent Application No. 2018-182616, filed Sep. 27, 2018 and Japanese Patent Application No. 2018-182617, filed Sep. 27, 2018, including the specification, drawings and abstract is incorporated herein by reference in its entirety.

APPENDIX

In the above-described embodiments, the electronic glasses are described as an eyewear. The eyewear according to the present invention is not limited to electronic glasses. Other examples of the eyewear include sunglasses, goggles, and head-mounted displays.

REFERENCE EXAMPLE

Hereinafter, the configuration of an eyewear and program according to Reference Example of the present invention will be described. The eyewear and program according to the Reference Example correspond to the eyewear and program according to Embodiment 2. Such an eyewear and program according to Reference Example may be implemented solely or may be implemented by mainly using the eyewear and program according to Reference Example in combination with the eyewear and program according to Embodiment 1.

Reference Example 1

An eyewear according to Reference Example 1 includes a frame;

a lens that is supported by the frame and that includes an optical property changeable portion of which an optical property is changed by electrical control;

an acquisition section that acquires information on an information medium facing the lens;

an angle detection section that detects angle information on an inclination angle of the frame; and a control section that performs the electrical control based on an input operation from a user in a first mode and that performs the electrical control based on a detected value of the angle detection section and information on the information medium in a second mode.

Reference Example 2

An eyewear according to Reference Example 2 is the eyewear according to Reference Example 1, and the information medium is an external terminal wirelessly connected to the eyewear; and the acquisition section acquires information on the information medium from the external terminal.

Reference Example 3

An eyewear according to Reference Example 3 is the eyewear according to Reference Example 1 or 2 and further includes a storage section that stores a first threshold for each information medium, and in the second mode, the control section acquires the first threshold associated with the acquired information on the information medium from the storage section and, when a detected value of the angle detection section is greater than or equal to the first threshold, sets the optical property changeable portion to an on state through the electrical control.

Reference Example 4

An eyewear according to Reference Example 4 is the eyewear according to Reference Example 3, and the storage section stores a second threshold for each information medium; and in the second mode, the control section acquires the second threshold associated with the acquired information on the information medium from the storage section and, when a detected value of the angle detection section is less than or equal to the second threshold, sets the optical property changeable portion to an off state through the electrical control.

Reference Example 5

An eyewear according to Reference Example 5 is the eyewear according to Reference Example 3 or 4, and in the first mode, the detection section detects the angle information when the optical property changeable portion becomes the on state through the electrical control of the control section; and the control section updates the first threshold stored in the storage section with a detected value of the angle detection section in the first mode.

Reference Example 6

An eyewear according to Reference Example 6 is the eyewear according to Reference Example 3 or 4, and in the first mode, the detection section detects the angle information during a period from when the optical property changeable portion becomes the on state and then becomes an off state through the electrical control of the control section; and the control section updates the first threshold stored in the storage section with a detected value detected at a highest frequency by the angle detection section in the period.

Reference Example 7

A program according to Reference Example 7 causes a computer, mounted on an eyewear including a lens that is supported by a frame and that has an optical property changeable portion of which an optical property is changed by electrical control, to execute:

a process of acquiring information on an information medium facing the lens;

a process of detecting angle information on an inclination angle of the frame; and a process of performing the electrical control based on the detected angle information and the acquired information on the information medium.

Reference Example 8

A program according to Reference Example 8 is the program according to Reference Example 7 and further includes a process of acquiring a first threshold associated with the information medium, and in the process of performing the electrical control, when the information on the inclination angle coincides with the first threshold, the optical property changeable portion is set to an on state.

Reference Example 9

A program according to Reference Example 9 is the program according to Reference Example 8 and further includes a process of causing the computer to execute the process of detecting information on the inclination angle when the electrical control is performed based on an input operation of the user and updating the stored first threshold with the detected information on the inclination angle.

INDUSTRIAL APPLICABILITY

The present invention is not limited to electronic glasses and suitably usable in various eyewears.

REFERENCE SIGNS LIST

G Electronic glasses
10 Frame
10a Front
10b, 10c Temple
10d Rim
10e Bridge
10f Nose pad
10g Casing
11 Lens
11a First region
11b Second region
110 First substrate
110a Diffraction structure
111 Property changeable portion
111a First electrode
111c Liquid crystal module
111e Second electrode
112 Second substrate
12, 12A Operation input section
13, 13A Power supply
14, 14A Communication section
15, 15A Angle detection section
16, 16A Distance detection section
17, 17A illuminance detection section
18, 18A Motion detection section
19, 19A Storage section
20, 20A Control section
21 Wire
22A Recognition section
23A Acquisition section
5, 5A External terminal 51, 51A Communication section
52, 52A Input section
53, 53A Display section
54 Image pickup section
55 State acquisition section
56, 56A Distance detection section
57 Image recognition section
58, 58A Storage section
59, 59A Control section
1001 Processor
1002 Input apparatus
1003 Output apparatus
1004 Memory
1005 Storage
1006 Image pickup apparatus
1007 Communication interface (IF)
1008 Sensor
1009 Power supply circuit
1010 Bus
7 Server
71 Communication section
72 Storage section
73 Control section

What is claimed is:

1. An eyewear, comprising:
a frame;
a lens that is supported by the frame and that includes an optical property changeable portion of which an optical property is changed by electrical control;
a communication section that receives first information from an external terminal which is being used and viewed by user; and
a control section that controls the optical property changeable portion based on the first information,
wherein:
the eyewear further comprises a first angle detection section that detects an angle of the eyewear;
the control section determines whether a posture of a user of the eyewear is an appropriate posture to use the eyewear based on the detected angle of the eyewear; and
when the first information is information indicating a start of use of the external terminal and the control section determines that the posture of the user is appropriate, the control section sets the optical property changeable portion to an on state.

2. The eyewear according to claim 1, wherein, when the first information is information indicating an end of use of the external terminal, the control section sets the optical property changeable portion to an off state.

3. The eyewear according to claim 1, wherein, when a duration of an on state of the optical property changeable portion is longer than or equal to a predetermined time, the communication section transmits, to the external terminal, time excess information indicating that the duration is longer than or equal to the predetermined time.

4. The eyewear according to claim 1, wherein, when a duration of an on state of the optical property changeable portion is longer than or equal to a predetermined time, the communication section transmits, to the external terminal, a signal for indicating alert information.

5. The eyewear according to claim 1, wherein, when a duration of an on state of the optical property changeable portion is longer than or equal to a predetermined time, the communication section transmits, to the external terminal, a signal for stopping display of the external terminal.

6. The eyewear according to claim 1, wherein, when a duration of an on state of the optical property changeable portion is longer than or equal to a predetermined time, the communication section transmits, to the external terminal, a signal for indicating information prompting a user of the eyewear to do exercise.

7. The eyewear according to claim 1, wherein:
the first information is information on a state of a user of the eyewear; and
when the information on the state of the user applies to a predetermined condition, the control section sets the optical property changeable portion to an on state.

8. The eyewear according to claim 1, wherein:
the first information is information on a state of the eyewear; and
when the information on the state of the eyewear applies to a predetermined condition, the control section sets the optical property changeable portion to an on state.

9. The eyewear according to claim 1, wherein
when the posture of the user is not appropriate, the communication section transmits, to the external terminal, information on a determined result of the control section.

10. The eyewear according to claim 1, wherein:
the control section determines whether a posture of a user using the eyewear is an appropriate posture to use the eyewear based on acquired information on a distance between the eyewear and the external terminal; and
when the posture of the user is not appropriate, the communication section transmits, to the external terminal, information on a determined result of the control section.

* * * * *